US012809302B2

(12) United States Patent
Oshima et al.

(10) Patent No.: US 12,809,302 B2
(45) Date of Patent: Nov. 24, 2026

(54) SHEET PROCESSING APPARATUS AND IMAGE FORMING SYSTEM WITH BRUSH MEMBER INCLUDING END PORTION WITH BRISTLES INCLINED TOWARD CENTER OF BRUSH MEMBER IN ROTATION AXIS DIRECTION

(71) Applicant: CANON KABUSHIKI KAISHA, Tokyo (JP)

(72) Inventors: Nobuo Oshima, Tokyo (JP); Shunsuke Matsushita, Kanagawa (JP); Taichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 18/595,699

(22) Filed: Mar. 5, 2024

(65) Prior Publication Data

US 2024/0302784 A1 Sep. 12, 2024

(30) Foreign Application Priority Data

Mar. 10, 2023 (JP) ................................ 2023-037890

(51) Int. Cl.
*G03G 21/00* (2006.01)
*A46B 9/02* (2006.01)
(Continued)

(52) U.S. Cl.
CPC ......... *G03G 21/0035* (2013.01); *A46B 9/025* (2013.01); *A46B 9/028* (2013.01);
(Continued)

(58) Field of Classification Search
CPC ...... G03G 21/0035; A46B 9/025; A46B 9/028
See application file for complete search history.

(56) References Cited

U.S. PATENT DOCUMENTS 9,971,298 B2 * 5/2018 Matsukawa ........ G03G 21/1853
11,860,566 B2 1/2024 Kanazawa et al.
(Continued)

FOREIGN PATENT DOCUMENTS

JP H04195080 A * 7/1992
JP H09-311526 A 12/1997
(Continued)

OTHER PUBLICATIONS

English translation of JP 2001-215799.*

*Primary Examiner* — Arlene Heredia Ocasio
(74) *Attorney, Agent, or Firm* — Venable LLP

(57) ABSTRACT

An image forming apparatus includes an image bearing member, a developing member, a transfer unit configured to transfer a toner image, and a brush member configured to come into contact with a surface of the image bearing member in a contact portion. In a case where a ratio of an area in which the brush member is in contact with the image bearing member per unit area in the contact portion is defined as a contact area ratio, and a range in a rotation axis direction of the image bearing member in which the developing member is configured to supply toner to the developing portion is defined as an image area, the brush member includes a portion which is outside the image area in the rotation axis direction and in which the contact area ratio is higher than the contact area ratio in the image area.

13 Claims, 21 Drawing Sheets

(51) Int. Cl.

| | |
|---|---|
| ***A46D 1/00*** | (2006.01) |
| ***G03G 15/08*** | (2006.01) |
| ***G03G 15/16*** | (2006.01) |

(52) U.S. Cl.

CPC ........... *A46D 1/02* (2013.01); *G03G 15/0881* (2013.01); *G03G 15/1605* (2013.01); *A46B 2200/3073* (2013.01)

(56) References Cited

U.S. PATENT DOCUMENTS

| | | | | |
|---|---|---|---|---|
| 2023/0152746 | A1 | 5/2023 | Matsushita et al. | |
| 2023/0195026 | A1* | 6/2023 | Kanazawa ......... | G03G 21/0064 399/149 |
| 2024/0085846 | A1 | 3/2024 | Kanazawa et al. | |

FOREIGN PATENT DOCUMENTS

| | | | | |
|---|---|---|---|---|
| JP | 2001215799 | A | * | 8/2001 |
| JP | 2001-249525 | A | | 9/2001 |
| JP | 2002-123126 | A | | 4/2002 |
| JP | 2010-014982 | A | | 1/2010 |
| JP | 2017-122889 | A | | 7/2017 |

* cited by examiner

SHEET PROCESSING APPARATUS AND IMAGE FORMING SYSTEM WITH BRUSH MEMBER INCLUDING END PORTION WITH BRISTLES INCLINED TOWARD CENTER OF BRUSH MEMBER IN ROTATION AXIS DIRECTION

BACKGROUND OF THE INVENTION

Field of the Invention

The present disclosure relates to an image forming apparatus that forms an image on a recording material.

Description of the Related Art

Japanese Patent Application Laid-Open No. 2001-215799 A describes an electrophotographic image forming apparatus having a cleanerless configuration (also referred to as a simultaneous development/cleaning system) in which residual toner that has not been transferred from an image bearing member (a photosensitive member) to a recording material is collected by a developing unit for reuse.

In addition, in the electrophotographic image forming apparatus, a charging member may be contaminated due to residual toner that has not been transferred to the recording material in a transfer portion, resulting in various problems such as charging failures and collection failures in the developing unit. Japanese Patent Application Laid-Open Nos. H09-311526 A and 2001-249525 A describe that contamination caused by residual toner is reduced by preventing a charging roller from being in contact with a photosensitive member. Japanese Patent Application Laid-Open No. 2010-14982 A describes that, in a cleanerless configuration, an occurrence of an afterimage caused by a failure in collecting residual toner is prevented by arranging a toner scattering roller that scatters the residual toner.

SUMMARY OF THE INVENTION

The present invention provides an image forming apparatus capable of reducing toner leakage from a brush member.

According to an aspect of the invention, an image forming apparatus includes an image bearing member configured to rotate, a developing member configured to develop an electrostatic latent image formed on the image bearing member using toner in a developing portion, a transfer unit configured to transfer a toner image developed by the developing member from the image bearing member to a transfer object in a transfer portion, and a brush member configured to come into contact with a surface of the image bearing member in a contact portion downstream of the transfer portion and upstream of the developing portion in a rotation direction of the image bearing member, wherein the image forming apparatus is configured such that toner that has not been transferred to the transfer object in the transfer portion is collected by the developing member, and wherein in a case where a ratio of an area in which the brush member is in contact with the image bearing member per unit area in the contact portion is defined as a contact area ratio, and a range in a rotation axis direction of the image bearing member in which the developing member is configured to supply toner to the developing portion is defined as an image area, the brush member includes a portion which is outside the image area in the rotation axis direction and in which the contact area ratio is higher than the contact area ratio in the image area.

According to another aspect of the invention, an image forming apparatus includes an image bearing member configured to rotate, a developing member configured to develop an electrostatic latent image formed on the image bearing member using toner in a developing portion, a transfer unit configured to transfer a toner image developed by the developing member from the image bearing member to a transfer object in a transfer portion, and a brush member configured to come into contact with a surface of the image bearing member in a contact portion downstream of the transfer portion and upstream of the developing portion in a rotation direction of the image bearing member, wherein the image forming apparatus is configured such that toner that has not been transferred to the transfer object in the transfer portion is collected by the developing member, and wherein in a case where a range in which the developing member is configured to supply toner to the developing portion in a rotation axis direction of the image bearing member is defined as an image area, the brush member includes a portion which is outside the image area in the rotation axis direction and in which part of hair of the brush member is inclined toward a center of the brush member in the rotation axis direction.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

Example 1

Figure 2:
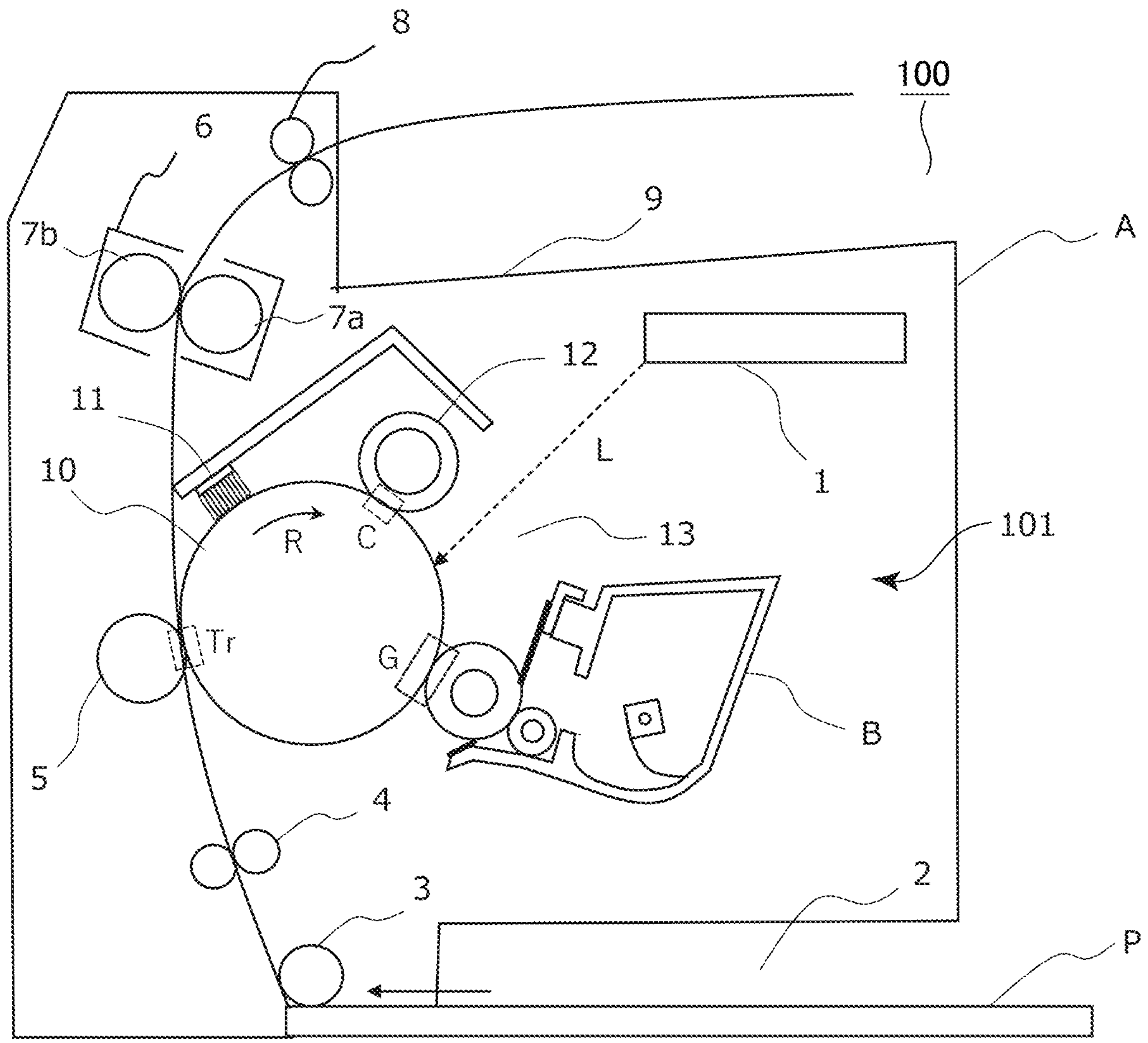
FIG. 2 is a schematic view of an image forming apparatus according to Example 1.

An image forming apparatus according to Example 1 will be described. FIG. 2 is a schematic view of an image forming apparatus 100 according to the present example. The image forming apparatus 100 is a laser beam printer using an electrophotographic technology. The image forming apparatus 100 forms an image on a sheet P which is a recording material (recording medium) on the basis of image information received from the outside. In the present disclosure, the "image forming apparatus" is not limited to a single-function printer having only a printing function, and may be, for example, a copier, a facsimile, a multifunction peripheral having a plurality of functions, or a large commercial printer.

As illustrated in FIG. 2, the image forming apparatus 100 includes an image forming apparatus body (hereinafter, the apparatus body A) and a process unit B housed in the apparatus body A. Although the process unit B according to the present example will be described as being fixed to the apparatus body A, the process unit B may be a cartridge (process cartridge) detachable (replaceable by the user) from the apparatus body A. Note that, in a case where the process unit B is fixed to the apparatus body A, each component of the process unit B, including a brush member 11 to be described below, is used for a longer period of time than in a case where the process cartridge is used. Therefore, it is preferable that the brush member 11 can maintain high performance even when used for a long period of time.

The apparatus body A includes a laser scanner unit as an exposing unit 1 and a sheet tray 2 as a sheet accommodating portion. The exposing unit 1 is positioned above the process unit B, and the sheet tray 2 is positioned below the process unit B. The sheet tray 2 accommodates sheets P in a stacked state. As the sheet P, various sheet materials that are different in size and material, such as paper such as plain paper and thick paper, a sheet material subjected to surface treatment such as coated paper, a sheet material having a special shape such as an envelope and index paper, a plastic film, and cloth, can be used.

The apparatus body A includes a pickup roller 3 as a feeding member, a conveyance roller pair 4, a transfer roller 5, a fixing unit 6, and a sheet discharge roller pair 8 as a sheet discharge unit. These elements 3 to 8 are arranged along a conveyance path of the sheet Pin the apparatus body A. The fixing unit 6 includes a heating roller 7_a_ and a pressure roller 7_b_ that convey the sheet P in a nipped state therebetween, and a heating unit such as a halogen lamp that heats the heating roller 7_a_.

The process unit B, the exposing unit 1, the transfer roller 5, and the fixing unit 6 constitute an image forming unit 101 as an image forming unit that forms an image on a recording material. Further, a transfer portion Tr is formed as an opposing portion between the transfer roller 5 and the photosensitive drum 10. The transfer roller 5 is an example of a transfer unit that transfers a toner image from an image bearing member (the photosensitive drum 10) to a transfer object (the sheet P) in the transfer portion Tr. For example, a corona discharge transfer device may be used as the transfer roller 5.

Process Unit

Figure 3:
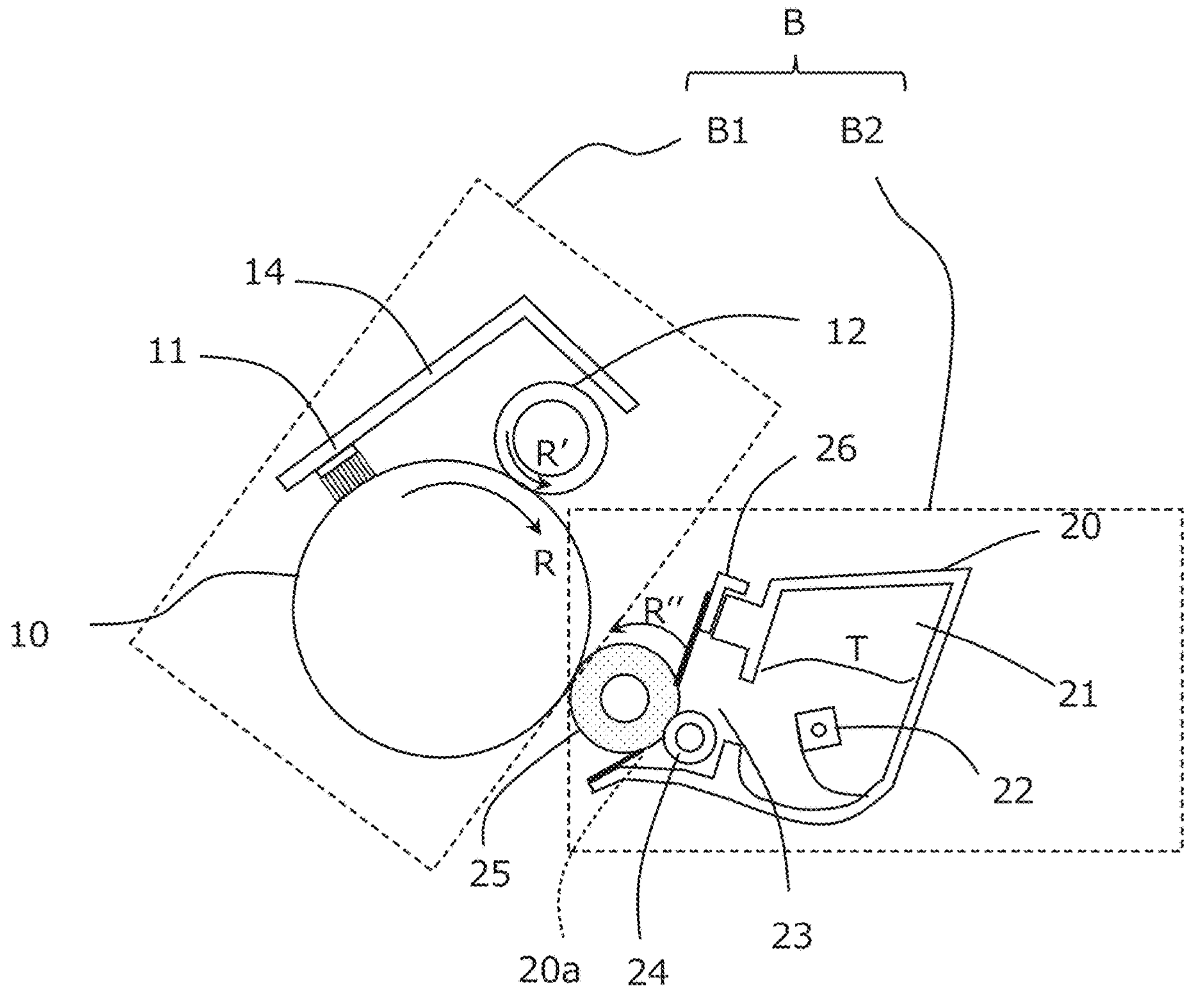
FIG. 3 is a diagram illustrating a process unit according to Example 1.

FIG. 3 is a schematic view of the process unit B. The process unit B includes a drum unit B1 (also called a latent image device unit) and a developing unit B2. The drum unit B1 and the developing unit B2 may be configured to be independently detachable from the apparatus body A.

The drum unit B1 includes a photosensitive drum 10, a charging roller 12, a brush member 11, and a frame body 14. The photosensitive drum 10 is a member in which a photosensitive layer such as an organic photosensitive member is formed on a cylindrical substrate having a diameter of, for example, 24 mm. The photosensitive drum 10 functions as an image bearing member that bears an electrostatic latent image and a toner image. The charging roller 12 is an example of a charger that charges the photosensitive drum 10. The charging roller 12 according to the present example is a roller that contacts the photosensitive drum 10. During an image forming operation, the photosensitive drum 10 is driven to rotate in a rotation direction R, and the charging roller 12 is driven to rotate in a direction indicated by an arrow R' in the drawing. A charging portion C is formed as an opposing portion between the charging roller 12 and the photosensitive drum 10 (FIG. 2).

The brush member 11 is disposed to be in contact with the photosensitive drum 10 in a contact portion downstream of the transfer portion Tr (FIG. 2) and upstream of the charging portion C in the rotation direction R of the photosensitive drum 10. The brush member 11 will be described in detail below.

Figure 4A:
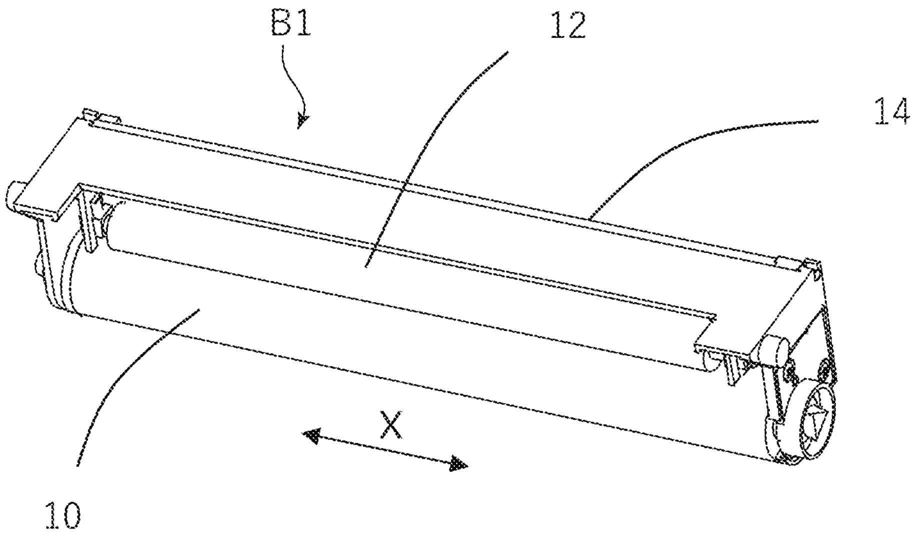
FIG. 4A is a perspective view illustrating a drum unit according to Example 1.
Figure 4B:
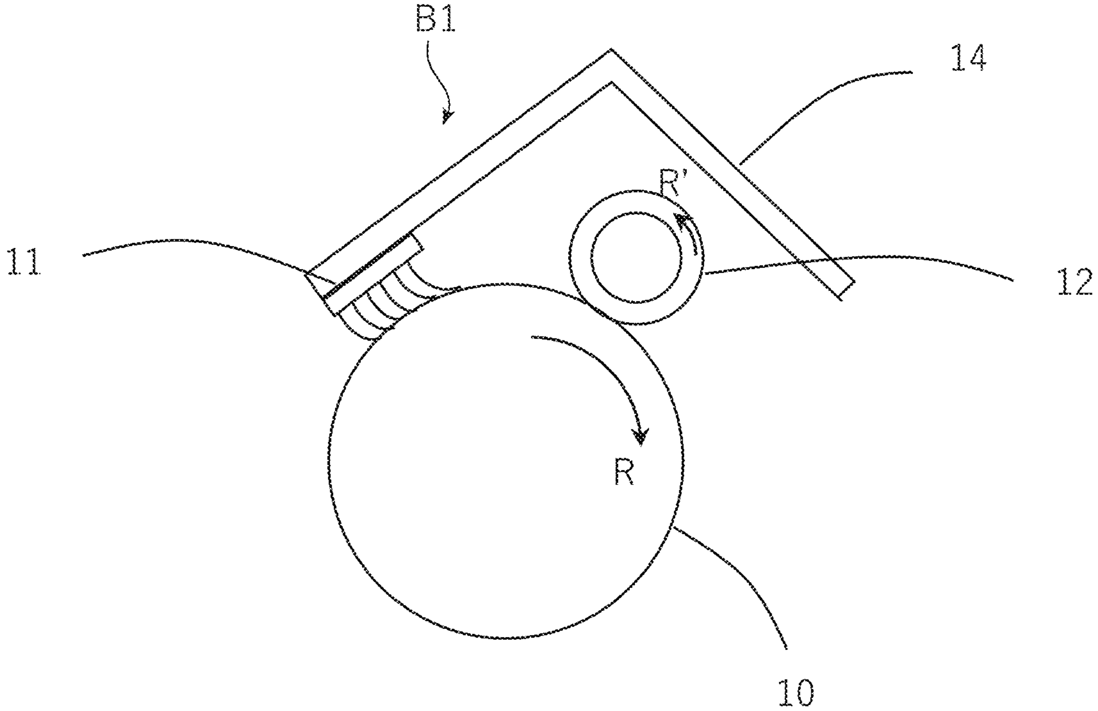
FIG. 4B is a cross-sectional view illustrating the drum unit according to Example 1.

FIG. 4A is a perspective view of the drum unit B1, and FIG. 4B is a cross-sectional view of the drum unit B1. As illustrated in FIGS. 4A and 4B, the photosensitive drum 10 and the charging roller 12 are rotatably supported by the frame body 14. The brush member 11 is supported by the frame body 14.

Figure 15:
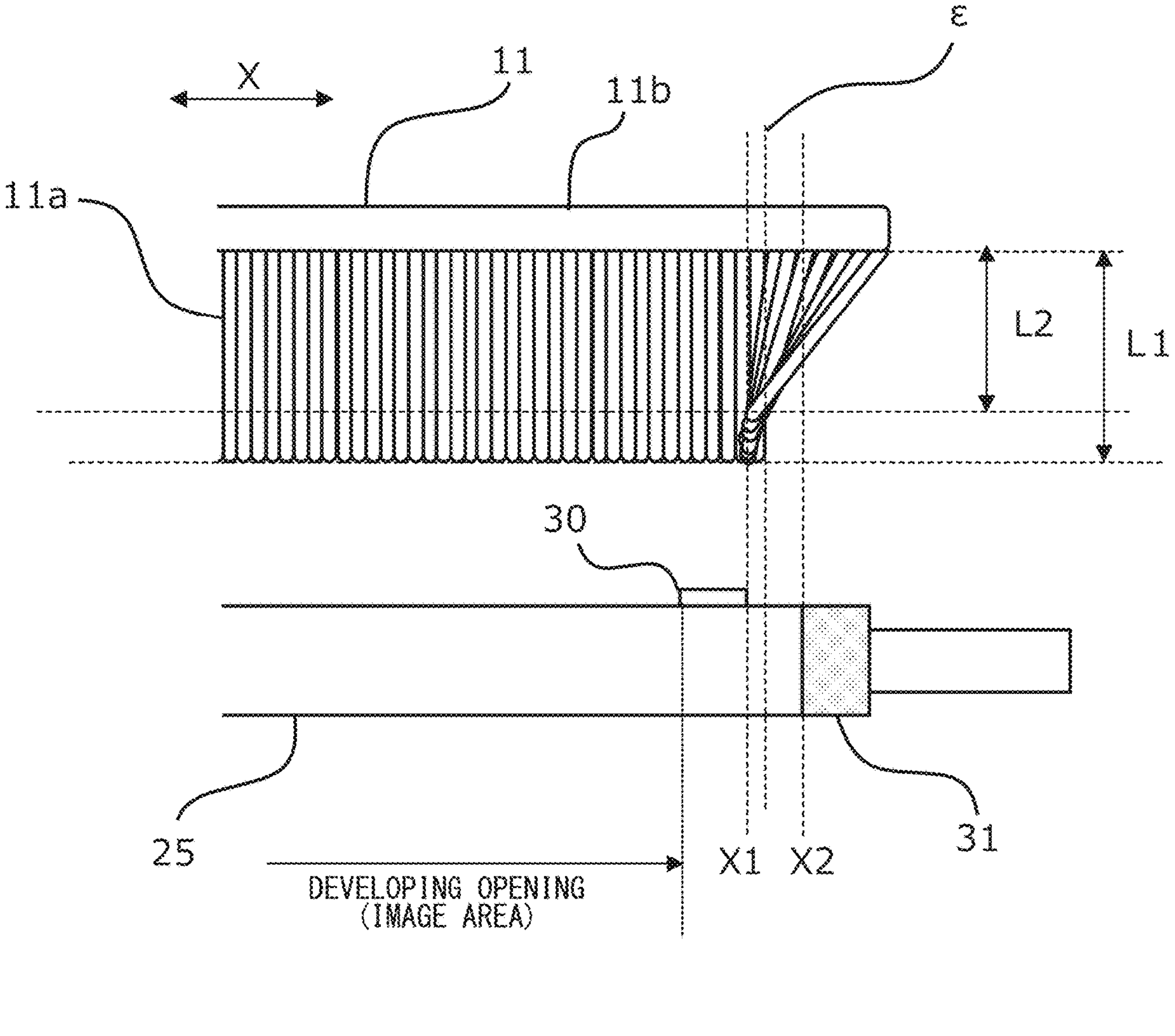
FIG. 15 is a view illustrating the brush member according to Example 1.

As illustrated in FIG. 3, the developing unit B2 includes a developing roller 25, a supply roller 24, a developing blade 26, a developing container 20 (developing frame body), a stirring/conveying member 22, an end seal 30 (FIG. 15), and a contact member 31 (FIG. 15). A toner storage chamber 21 and a toner supply chamber 23 are provided inside the developing container 20.

The developing roller 25 rotates while bearing a toner T as a developer, and functions as a developing member (developer bearing member) to supply the toner T to the photosensitive drum 10. As the developing roller 25, for example, an elastic roller having a diameter of 12 mm and including an elastic layer of conductive rubber or the like is used. The contact member 31 is provided at an end (FIG. 15) of the developing roller 25 in a rotation axis direction of the developing roller 25. The contact member 31 comes into contact with a portion provided to be contacted on the photosensitive drum 10 to control a distance (inter-axial distance) between the developing roller 25 and the photosensitive drum 10 and maintain a constant inroad amount of the developing roller 25 against the photosensitive drum 10. The supply roller 24 supplies the toner T to the developing roller 25 to stabilize a toner bearing amount on the developing roller 25. As the supply roller 24, for example, a spongy roller having a diameter of 10 mm is used.

The toner T is stored in the toner storage chamber 21 and the toner supply chamber 23. The supply roller 24 and the developing roller 25 are disposed in the toner supply chamber 23, and the stirring/conveying member 22 is disposed in the toner storage chamber 21. The toner storage chamber 21 and the toner supply chamber 23 communicate with each other. The stirring/conveying member 22 stirs the toner T in the toner storage chamber 21 for uniformization. Further, the stirring/conveying member 22 conveys the toner T from the toner storage chamber 21 toward the toner supply chamber 23. The developing roller 25, the supply roller 24, and the stirring/conveying member 22 are rotatably supported by the developing container 20. The developing blade 26 is supported by the developing container 20 to regulate an amount of the toner borne on the developing roller 25 and frictionally charge the toner.

The developing container 20 has a developing opening 20*a*, which is an opening portion where the developing roller 25 is disposed. A portion of an outer circumferential surface of the developing roller 25 is located inside the developing container 20 (in the toner supply chamber 23) with respect to the developing opening 20*a*, and the other portion of the outer circumferential surface is located outside the developing container 20 with respect to the developing opening 20*a*. The developing roller 25 faces the photosensitive drum 10 outside the developing container 20. A developing portion G (a development area, see FIG. 2) is formed as an opposing portion between the photosensitive drum 10 and the developing roller 25.

The end seal 30 (FIG. 15) is attached to the developing container 20 so as to seal a longitudinal end of the developing opening 20*a* such that the toner T is kept from leaking out of the developing container 20. The longitudinal end of the developing opening 20*a* is an end of the developing opening 20*a* in the rotation axis direction of the developing roller 25 (a longitudinal direction of the developing unit B2).

As illustrated in FIG. 2, the drum unit B1 and the developing unit B2 are positioned at predetermined positions in the apparatus body A. The drive from the drive source in the apparatus body A is transmitted to the drum unit B1 and the developing unit B2 to enable an image forming operation.

In the present example, the process unit B includes a contacting/separating mechanism that contacts/separates the photosensitive drum 10 and the developing roller 25 with/from each other. By separating the photosensitive drum 10 and the developing roller 25 from each other when an image forming operation is not executed, deformation or the like can be prevented in a case where the photosensitive drum 10 and the developing roller 25 are left in contact with each other for a long period of time. The photosensitive drum 10 and the developing roller 25 may constantly contact with each other, without providing the contacting/separating mechanism.

Image Forming Operation

Next, an image forming operation (an image forming process) of the image forming apparatus 100 will be described with reference to FIGS. 2 and 3. When image information is input to the image forming apparatus 100, the photosensitive drum 10 is driven to rotate at a predetermined circumferential speed (a process speed, 100 mm/sec in the present example) in a predetermined rotation direction R. When a charging voltage is applied to the charging roller 12, the charging roller 12 uniformly charges the surface of the photosensitive drum 10. The charging voltage is, for example, a DC voltage of −1100 V, and the surface potential of the photosensitive drum 10 after being charged is −500 V.

In the present example, the circumferential speed of the charging roller 12 is set to about 110% of the circumferential speed of the photosensitive drum 10. By setting this speed, the toner passing through the contact portion (charging portion C) between the charging roller 12 and the photosensitive drum 10 is rubbed against the surfaces of the charging roller 12 and the photosensitive drum 10 to be frictionally charged. This makes it easier to collect the toner in the developing portion to be described below.

The exposing unit 1 outputs laser light L corresponding to the image information. The laser light L is emitted to the surface of the photosensitive drum 10, after passing through an exposure space portion 13 provided between the drum unit B1 and the developing unit B2 at an upper portion of the process unit B. As a result, the photosensitive drum 10 is exposed, and an electrostatic latent image corresponding to the image information is formed on the surface of the photosensitive drum 10.

The developing unit B2 develops the electrostatic latent image onto a toner image by supplying the toner to the photosensitive drum 10 through the developing roller 25. As illustrated in FIG. 3, the developing roller 25 rotates while bearing the toner T in the toner supply chamber 23, and conveys the toner T toward the developing portion G. The developing roller 25 according to the present example is driven to rotate in a direction indicated by an arrow R" at a circumferential speed (140 mm/sec in the present example) of 140% with respect to the circumferential speed of the photosensitive drum 10. The toner T borne on the developing roller 25 is rubbed by the developing blade 26, so that the toner T is frictionally charged to a negative polarity (a normal polarity of the toner T), and the layer thickness is regulated to a predetermined thickness. A negative developing voltage (−350 V in the present example) is applied to the developing roller 25. As a result, in the developing portion G, the toner T is transferred from the developing roller 25 to the photosensitive drum 10 according to the distribution of the surface potential on the photosensitive drum 10, and the electrostatic latent image is visualized as a toner image. Note that, in the developing portion G, collection of residual toner to be described below is performed in parallel with development (simultaneous development/cleaning).

In parallel with the toner image forming process described above, the sheet P is supplied to the image forming unit 101. As illustrated in FIG. 2, the uppermost sheet P among sheets P stacked on the sheet tray 2 is fed by the pickup roller 3. The fed sheet P is conveyed toward the transfer portion Tr by the conveyance roller pair 4. The feeding and conveyance of the sheet P are controlled to be synchronized with a timing at which laser light L is output by the exposing unit 1 (a timing at an electrostatic latent image is written).

While the sheet P passes through the transfer portion Tr, a toner image is transferred from the photosensitive drum 10 to the sheet P by the transfer roller 5 to which a transfer voltage (+1000 kV in the present example) is applied. The sheet P having passed through the transfer portion Tr is separated from the photosensitive drum 10 and conveyed to the fixing unit 6, and passes through a nip portion (a fixing nip) between the heating roller 7*a* and the pressure roller 7*b*. The fixing unit 6 heats and pressurizes the toner image on the sheet P while conveying the sheet P in the nipped state at the fixing nip. As a result, an image fixed to the sheet P is obtained. The sheet P having passed through the fixing unit 6 is discharged to the outside of the apparatus body A by the sheet discharge roller pair 8, and is stacked on a sheet discharge tray 9.

Meanwhile, residual toner (transfer residual toner) that has not been transferred to the sheet P remains on the surface of the photosensitive drum 10 that has passed through the transfer portion Tr. The residual toner moves to a contact position of the brush member 11 as the photosensitive drum 10 rotates. Some of the residual toner may be charged to a polarity (a positive polarity) opposite to the normal polarity due to discharge caused by the transfer voltage. In the present example, a negative bias voltage (−350 V) is applied to the brush member 11 (brush voltage). As a result, the residual toner having the positive polarity, which is a non-normal polarity, is held by the brush member 11, and the residual toner having the negative polarity, which is a normal polarity, passes through the contact position of the brush member 11.

When the residual toner that has passed through the contact position of the brush member 11 reaches the charging portion C, the toner is strongly charged to the negative polarity due to discharge by the charging roller 12 to which a charging voltage is applied. Thereafter, when the residual toner reaches the developing portion G, the residual toner charged to the negative polarity by a potential difference between the photosensitive drum 10 and the developing roller 25 is transferred from the photosensitive drum 10 to the developing roller 25 and collected by the developing unit B2. The residual toner collected by the developing unit B2 is stirred in the developing container 20 to be uniformized with the other toner T, and is used again for image formation. Since both the residual toner and the toner in the developing container 20 are some of the toner T in the image forming apparatus 100, the residual toner may be simply called "toner" or "toner T" in the following description.

Brush Member

Figure 5A:
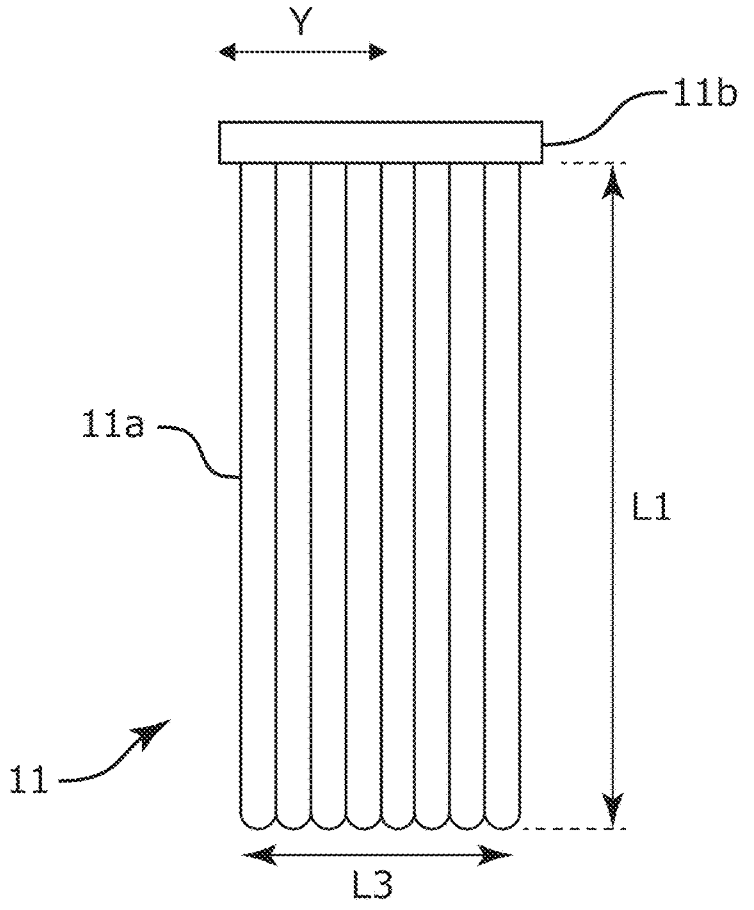
FIG. 5A is a view illustrating the brush member according to Example 1 in a stand-alone state.
Figure 5B:
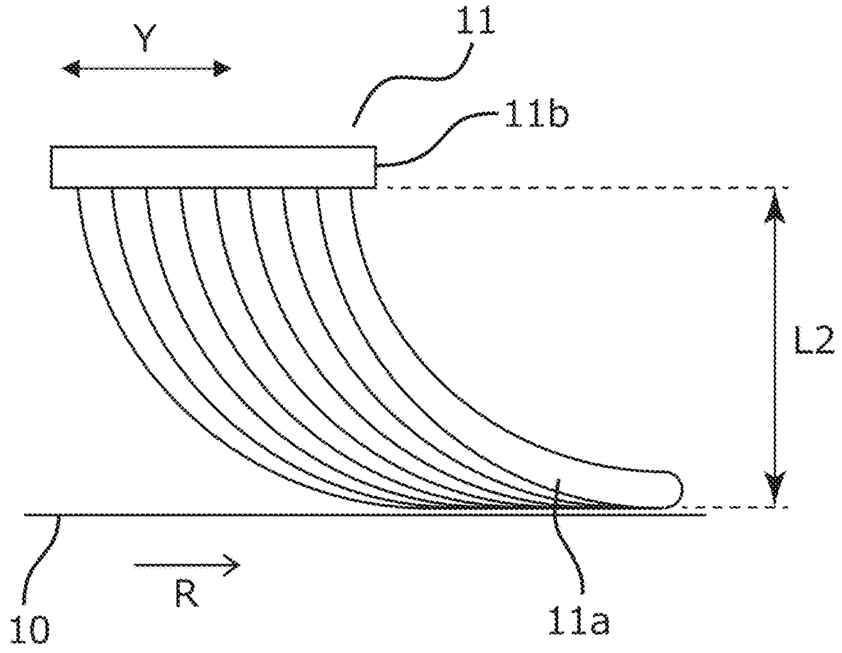
FIG. 5B is a view illustrating the brush member according to Example 1 in contact with the photosensitive drum.

A configuration of the brush member 11 will be described. FIG. 5A is a view illustrating the brush member 11 in a stand-alone state (a state before being attached to the frame body 14 of the drum unit B1) as viewed in a longitudinal direction X of the brush member 11. Here, the longitudinal direction X of the brush member 11 is a direction substantially parallel to a rotation axis direction of the photosensitive drum 10 (FIGS. 4A and 4B). FIG. 5B is a view illustrating the brush member 11 in contact with the photosensitive drum 10 as viewed in the longitudinal direction X.

As illustrated in FIGS. 5A and 5B, the brush member 11 includes a base cloth 11*b* that is a sheet-shaped base, and conductive threads 11*a* supported by the base cloth 11*b*. The brush member 11 according to the present example is a fixed brush disposed in a state where the base cloth 11*b* is fixed to the frame body 14. A brush portion (hair portion) of the brush member 11 is formed of an electrically conductive hair material. As the hair material to be brought into contact with the surface of the photosensitive drum 10, for example, a pile yarn made of an electrically conductive Nylon 6 composition can be preferably used. The material of the conductive threads 11*a* is not limited to nylon, and rayon, acrylic, polyester, or the like may be used.

As illustrated in FIG. 5A, in a state where the brush member 11 stands alone, that is, in a state where a force for bending the conductive threads 11*a* is not applied from the outside, a distance (fabric length) from the base cloth 11*b* to the distal ends of the conductive threads 11*a* is defined as L1. In the present example, L1 is 5.75 mm.

The base cloth 11*b* of the brush member 11 is fixed to a support member installed at a predetermined position of the frame body 14 by a fixer such as a double-sided tape or an adhesive. In addition, the brush member 11 is disposed as if the distal ends of the conductive threads 11*a* intrudes into the photosensitive drum 10. In the present example, the clearance between the support member and the photosensitive drum 10 is fixed.

As illustrated in FIG. 5B, the shortest distance from the base cloth 11*b* of the brush member 11 fixed to the frame body 14 to the photosensitive drum 10 as viewed in the longitudinal direction X is defined as L2. Note that, although it is illustrated in FIG. 5B that the surface of the photosensitive drum 10 and the base cloth 11*b* are substantially parallel to each other, the support member that supports the base cloth 11*b* may be disposed to be inclined with respect to the surface of the photosensitive drum 10 as viewed in the longitudinal direction X. In this case as well, the shortest distance from the base cloth 11*b* to the photosensitive drum 10 as viewed in the longitudinal direction X is defined as L2. The difference between L1 and L2 is defined as an inroad amount of the brush member 11 against the photosensitive drum 10.

As illustrated in FIG. 5B, by satisfying the relationship of L2<L1, the conductive threads 11*a* of the brush member 11 come into contact with the surface of the photosensitive drum 10, and are rubbed against the surface of the photosensitive drum 10 as the photosensitive drum 10 rotates. Furthermore, by adjusting the magnitude of the inroad amount, a contact pressure of the conductive threads 11*a* with respect to the photosensitive drum 10 or the like can be changed.

In the present example, as illustrated in FIG. 5A, a length L3 of the brush member 11 in a circumferential direction of the photosensitive drum 10 (hereinafter referred to as the transverse direction Y of the brush member 11 or simply referred to as the transverse direction Y) in the stand-alone state is 4 mm. In the present example, the length of the brush member 11 in the longitudinal direction X is 236 mm. The length of the brush member 11 is set such that the brush member 11 can contact an entire image area on the photosensitive drum 10 in the rotation axis direction (the longitudinal direction X) of the photosensitive drum 10. Here, the image area on the photosensitive drum 10 is a maximum area in which a toner image can be formed on the surface of the photosensitive drum 10 by the toner image forming process described above. In the present example, the image area is a range in the rotation axis direction of the photosensitive drum 10 in which the developing roller 25 (the developing member) can supply the toner to the developing portion G.

The length L3 of the brush member 11 in the transverse direction Y may be changed from the above-described value. The longer the length L3 of the brush member 11 in the transverse direction Y is, the longer the lifespan of the process unit B may be. In this case, for example, L3 may be longer than 4 mm. Note that the length L3 of the brush member 11 in the transverse direction Y is preferably 3 mm or more from the viewpoint of longer lifespan.

The length of the brush member 11 in the longitudinal direction X may be changed from the above-described value. For example, the length of the brush member 11 in the longitudinal direction X may be set according to the maximum size of the sheet on which the image forming apparatus 100 can form an image such that the brush member 11 can be brought into contact with the photosensitive drum 10 over the entire maximum sheet passage area. Here, the maximum sheet passage area is an area through which a sheet passes in the rotation axis direction of the photosensitive drum 10 when the sheet having a maximum size in which the image forming apparatus 100 is allowed to form an image passes through the transfer portion Tr.

In the present example, the conductive threads 11*a* have a thickness of 2 denier, and a density of 240 kF/inch^2. Here, the unit of density "kF/inch^2" indicates the number of hair fibers or filaments implanted per square inch of the base cloth 11*b*. The thickness and density of the conductive threads 11*a* may be appropriately determined in consideration of the passability of the toner. Specifically, if the conductive threads 11*a* are too thick, it may be difficult for the toner to pass through the brush member 11, and the toner may concentrate in an area where the toner passes in a relatively easy manner and come out in a streaky manner. In addition, if the density of the conductive threads 11*a* is too high, the toner may not pass through the brush member 11, and the toner clogged by the brush member 11 may scatter, causing a problem such as contamination inside the image forming apparatus 100. Therefore, in order for the toner to appropriately pass through the brush member 11, the conductive threads 11*a* preferably have a thickness of 1 to 6 denier and a density of 150 to 350 kF/inch^2, from the viewpoint of passability.

Note that, in the conductive threads 11*a* according to the present example, 1 to 6 denier, which are represented by a unit (denier) of fiber mass per unit length, are converted into about 10 μm to about 30 μm as fiber diameters. Therefore, even in a case where the hair of a material other than nylon is used for the brush member, a material of 1 denier or more and 6 denier or less in the unit of fiber mass per unit length, or a material having a fiber diameter of 10 μm or more and 30 μm or less may be used.

Clark Evans Index

Clark Evans Index is used as a numerical value indicating the density of the conductive threads 11*a* on the surface in contact with the photosensitive drum 10. This is defined as follows.

First, a distance from point i to the nearest neighbor point therefrom is defined as d_i, the number of points is defined as n, and an average value of distances from each point to its closest point is defined as an average nearest neighbor distance W $$W = \frac{1}{n}\sum_{i=1}^{n} d_i \qquad \text{(Formula 1)}$$

Here, as a classification criterion, a case where points are randomly distributed on a plane in an area S (according to a uniform Poisson distribution) is considered. In this case, an expected value E(W) of the average nearest neighbor distance W is as follows.

$$E(W) \approx \frac{1}{2\sqrt{\frac{n}{S}}} \qquad \text{(Formula 2)}$$

A value obtained by standardizing W obtained from the distribution of the conductive threads 11*a* on the surface in contact with the photosensitive drum 10 with the expected value E(W) is called a Clark Evans Index w.

$$w = \frac{W}{E(W)} \qquad \text{(Formula 3)}$$

By using the Clark Evans Index, it is possible to evaluate a degree of density of the distribution even when the number or density of points in the target plane is different. The Clark Evans Index has a property of w=1 in the case of random distribution, w<1 in the case of concentrated distribution (biased distribution), and w>1 in the case of regular distribution (dispersed distribution).

Figure 6A:
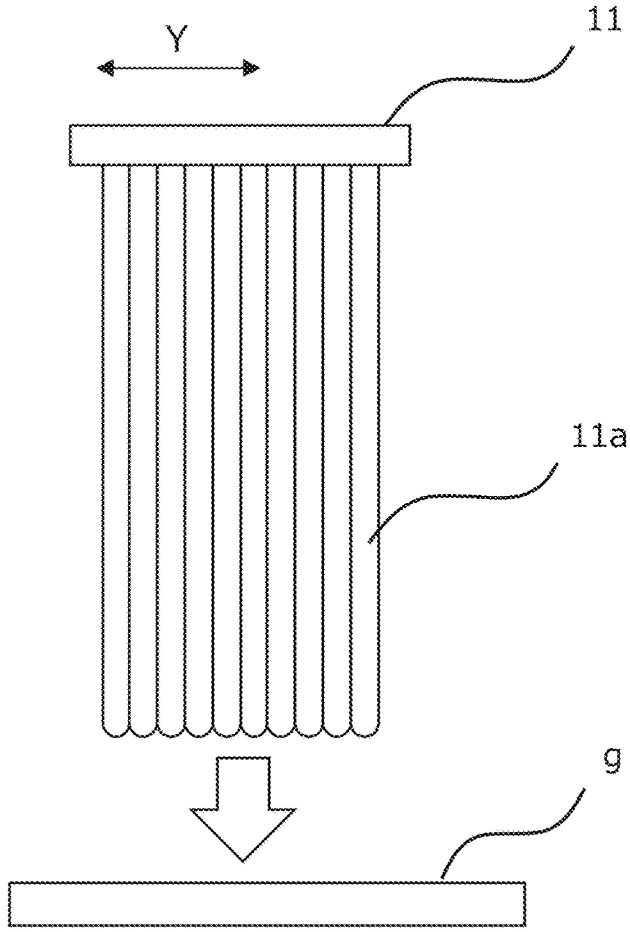
FIG. 6A is a view illustrating a method of measuring a Clark Evans Index.
Figure 6B:
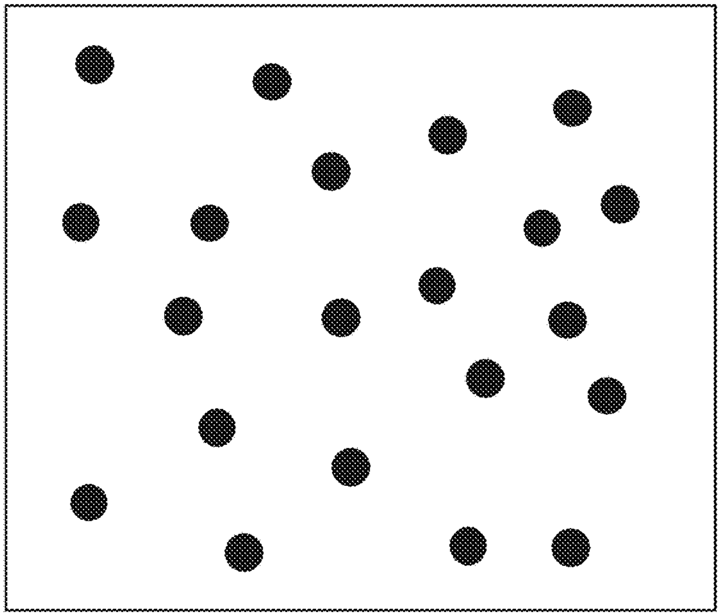
FIG. 6B is a view illustrating a method of measuring a Clark Evans Index.

A method of obtaining an actual Clark Evans Index of the brush member 11 will be described. As illustrated in FIG. 6A, positions of brush tips when the brush member 11 is pressed against a front surface of a glass plate g and the brush member 11 is observed from a back surface side of the glass plate g are represented by dots. As a result, a distribution of brush tips (a distribution of brush contact positions) in a certain fixed area (1 mm^2 in the present example) as illustrated in FIG. 6B is obtained. Here, since the brush member 11 is pressed as if the distal end of the brush member 11 makes an inroad against the surface of the glass plate g, portions other than the distal ends of the conductive threads 11*a* may come into contact with the surface of the glass plate g. Therefore, the distribution of the brush tips is obtained by plotting only the tip positions of the conductive threads 11*a*. From the distribution of the brush tips obtained in this manner, the Clark Evans Index w is calculated using (Formula 1) to (Formula 3).

In the present example, a preferable condition for the Clark Evans Index w of the brush member 11 is w≥1.

Disposition of Brush Member

Next, the disposition of the brush member 11 with respect to the photosensitive drum 10 in the present example will be described. In the present example, the brush member 11 is disposed such that the contact pressure with respect to the photosensitive drum 10 is lower on a front end side than on a rear end side of the brush member 11. Hereinafter, a front end portion of the brush refers to an upstream portion of the brush member 11 in the rotation direction of the photosensitive drum 10 (a first end side in the transverse direction Y of the brush member 11). In addition, a rear end portion of the brush refers to a downstream portion of the brush member 11 in the rotation direction of the photosensitive drum 10 (a second end side in the transverse direction Y of the brush member 11).

In the present example, the brush member 11 is preferably disposed obliquely with respect to the surface of the photosensitive drum 10 such that the contact pressure with respect to the photosensitive drum 10 gradually decreases from the front end portion toward the rear end portion of the brush member 11. This will be specifically described with reference to FIG. 7.

Figure 7:
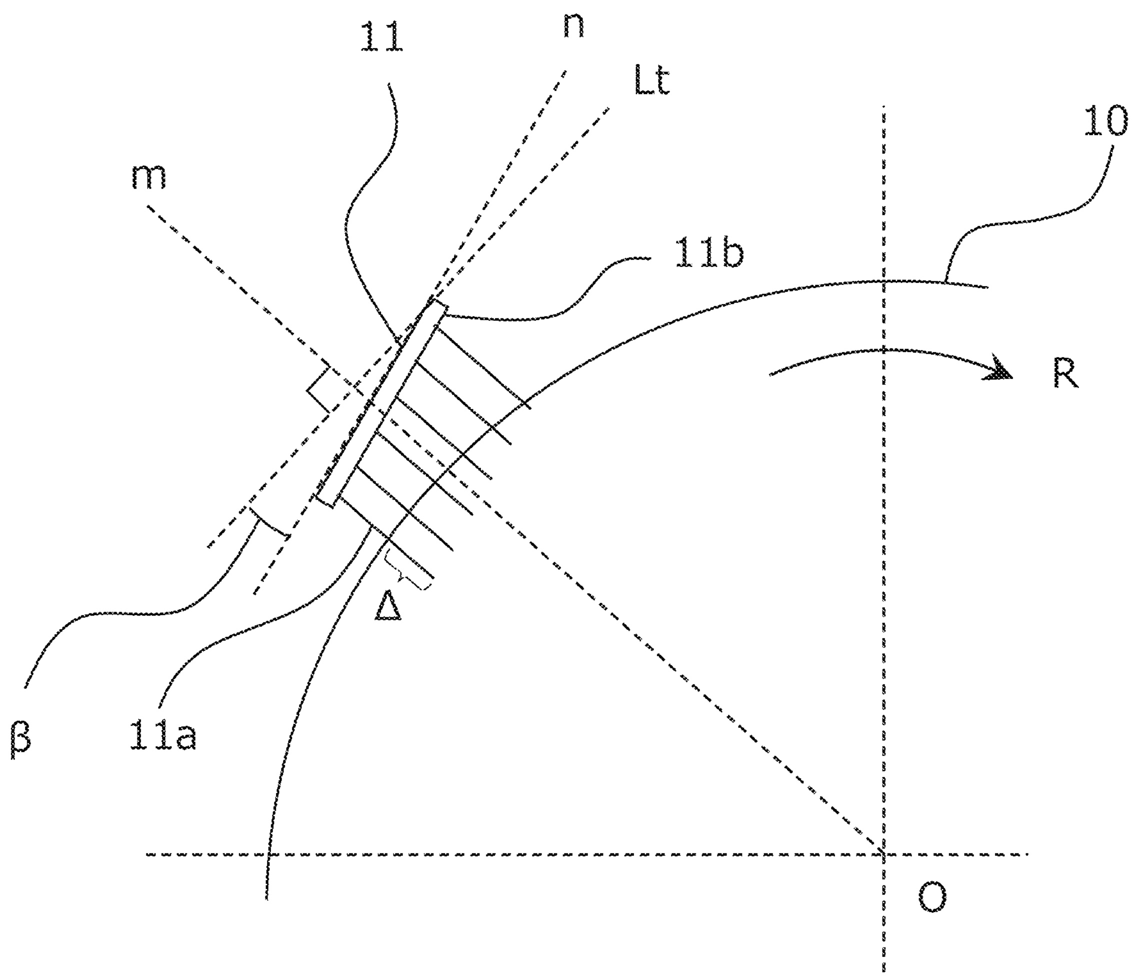
FIG. 7 is a view illustrating an inclination angle of the brush member according to Example 1.

FIG. 7 is a schematic view illustrating a state in which the photosensitive drum 10 and the brush member 11 are viewed in the rotation axis direction of the photosensitive drum 10 (the longitudinal direction X of the brush member 11). In FIG. 7, it is assumed that the conductive threads 11*a* of the brush member 11 is intruding into the surface of the photosensitive drum 10, rather than bending along the surface of the photosensitive drum 10.

In FIG. 7, a line Lt is a straight line parallel to a tangent line of the surface of the photosensitive drum 10 at an intersection point where a line m intersects with the surface of the photosensitive drum 10. The line Lt can be said to be drawn in a tangential direction of the surface of the photosensitive drum 10 at an opposing position where the brush member 11 faces the photosensitive drum 10. The line m is a straight line passing through the center O of the photosensitive drum 10 and the center of the base cloth 11*b* of the brush member 11 in the transverse direction Y Aline n is a straight line along the base cloth 11*b* of the brush member 11. When the brush member 11 is disposed in parallel to the surface of the photosensitive drum 10, the line Lt and the line n are parallel to each other from the viewpoint of FIG. 7.

In the present example, the brush member 11 is disposed such that the line n along the base cloth 11*b* is inclined with respect to the line Lt. The direction of the inclination is a direction in which the line n extends to the same side as the center O of the photosensitive drum 10 on the upstream side in the rotation direction R of the photosensitive drum 10 with respect to an intersection point between the line n and the line Lt, and the line n extends to the opposite side to the center O of the photosensitive drum 10 on the downstream side in the rotation direction R of the photosensitive drum 10 with respect to the intersection point.

An angle between the line n and the line Lt is defined as β. β can be called an inclination angle of the brush member 11 with respect to the photosensitive drum 10. In the present example, the inclination angle β is set to, for example, 12°. However, the value of the inclination angle β is not limited thereto, and is preferably set in a range of, for example, 8° or more and 160 or less.

In a case where the brush member 11 is inclined with respect to the photosensitive drum 10, the inroad amount of the brush member 11 against the photosensitive drum 10 is defined as an inroad amount (Δ in FIG. 7) at the front end portion of the brush. The inroad amount of the brush member 11 according to the present example is, for example, 1.2 mm.

Parameter for Controlling Contact State of Brush Member: Contact Pressure

In the present example, a contact pressure of the brush member 11 is used as a parameter for controlling a contact state of the brush member 11 with respect to the photosensitive drum 10. Hereinafter, a method of obtaining the contact pressure will be described.

Figure 8A:
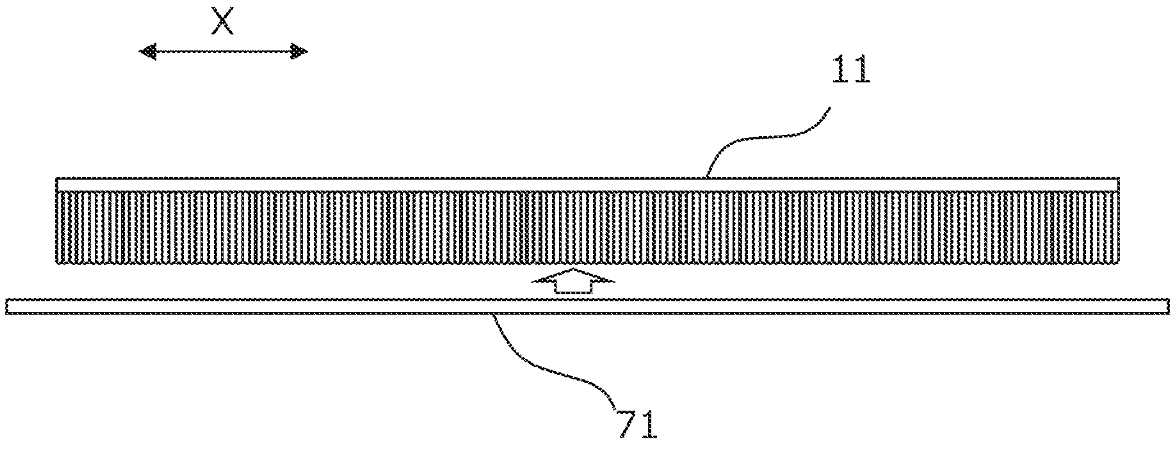
FIG. 8A is a view illustrating a method of measuring a contact pressure of the brush member.
Figure 8B:
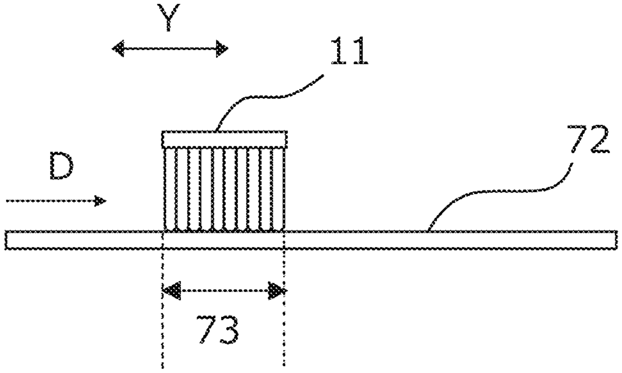
FIG. 8B is a view illustrating a method of measuring a contact pressure of the brush member.

As illustrated in FIG. 8A, by bring a compression test jig 71 for the Shimadzu compact desktop tester EZ Test into contact with the brush member 11, a normal force corresponding to the inroad amount of the brush member 11 against the photosensitive drum 10. In addition, as illustrated in FIG. 8B, the brush member 11 is brought into pressure contact with a transparent glass plate 72 moving in a movement direction D, and a contact width 73 in the transverse direction Y is measured by observing the brush member 11 from the opposite side to the side where the brush member 11 is pressed. Here, an average pressure is defined as follow (Formula 4).

Average pressure (gf/mm^2)=normal force/(contact width×longitudinal width) (Formula 4)

In addition, a portion where the inroad amount of the brush member 11 against the photosensitive drum 10 is largest is a portion where the contact pressure is largest. The largest contact pressure at this time is called a peak pressure. By adjusting the contact pressure, a contact state of the brush member 11 can be controlled. The peak pressure is calculated by (Formula 6) using an average inroad amount (Formula 5) obtained from the largest inroad amount and the smallest inroad amount.

Average inroad amount (mm)=(largest inroad amount+smallest inroad amount)/2 (Formula 5)

Peak pressure (gf/mm^2)=average pressure×largest inroad amount/average inroad amount (Formula 6)

The peak pressure can be obtained from the dimension, the inroad amount, the inclination angle, and the like of the brush member 11 by using the conversion formulas of (Formula 4) to (Formula 6) described above. The peak pressure can be calculated by this conversion formula when the brush member 11 is manufactured to have a uniform density and thickness. However, when the brush member 11 is not manufactured to have a uniform density and thickness based on positions in the transverse direction Y, the brush member 11 may be cut for each unit length in the transverse direction Y to obtain an average pressure by applying (Formula 4), and the largest value of the average pressure may be used as a peak pressure.

When the peak pressure is too high, the toner extremely hardly passes through the brush member 11. In this case, the toner is strongly blocked by the brush member 11, and the toner may shortly overflow from the brush member 11, and the toner leakage is likely to occur. In addition, if the peak pressure is too low, the toner easily passes through the brush member 11, and it may not be possible to sufficiently apply normal polarity charges to the toner. In this case, there is a possibility that the toner charged to the non-normal polarity (non-normally charged toner) may adhere to the charging roller 12 to which a bias voltage of a normal polarity is applied, and may contaminate the charging roller 12.

Therefore, the range of the peak pressure that allows the passage of the toner charged to the normal polarity (normally charged toner) while applying normal polarity charges to the toner is preferably, for example, 0.8 gf/mm^2 or more and 3.5 gf/mm^2 or less.

Another Parameter for Controlling Contact State of Brush Member: Contact Area Ratio In order for the toner to uniformly pass while applying normal polarity charges to the toner, it is preferable to control not only the peak pressure but also the density of the brush in contact with the photosensitive drum 10. As described above, it is preferable that, based on the density of the conductive threads 11*a* and the Clark Evans Index, the brush member 11 is manufactured to have a uniform density in the stand-alone state. However, when the brush member 11 is actually in contact with the photosensitive drum 10, only the foremost front end of the conductive threads 11*a* is not in contact with the photosensitive drum 10, and a portion other than the foremost front end of the brush is also in contact with the photosensitive drum 10 as illustrated in FIG. 5B.

Figure 9A:
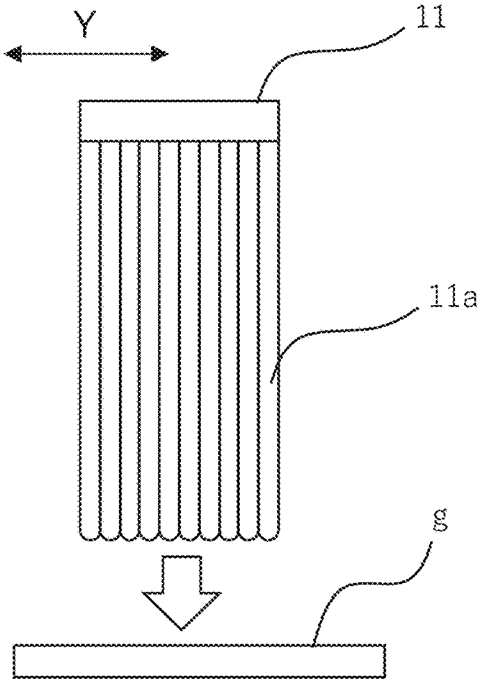
FIG. 9A is a view illustrating a method of measuring a contact area ratio of the brush member.
Figure 9B:
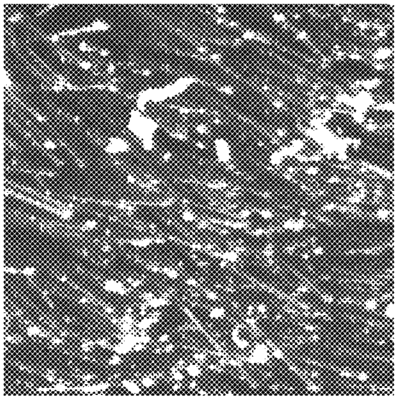
FIG. 9B is a view illustrating a method of measuring a contact area ratio of the brush member.
Figure 9C:
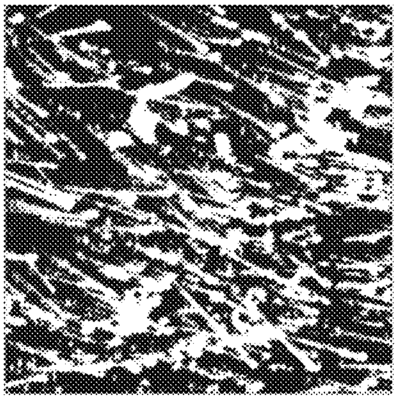
FIG. 9C is a view illustrating a method of measuring a contact area ratio of the brush member.

Therefore, in the present example, a contact area ratio is used as a numerical value indicating an actual contact state of the brush member 11. The contact area ratio represents a ratio of an area where the brush member 11 is in contact with the photosensitive drum 10 per unit area in a contact portion between the brush member 11 and the photosensitive drum 10. Specifically, the brush member 11 is brought into contact with the surface of the glass plate g as illustrated in FIG. 9A, and binarization processing is performed (FIG. 9C) based on an image (FIG. 9B) observed from the side opposite to the contact surface. In the binarized image, a numerical value indicating a ratio of an area in contact with the conductive threads 11*a* of the brush member 11 in a certain fixed area (1 mm^2 in the present example) is set as a contact area ratio. By using the contact area ratio as a control parameter, the density of the brush member 11 in the actual contact state can be grasped.

When the contact area ratio is too large, the conductive threads 11*a* of the brush member 11 are densely in contact with the surface of the photosensitive drum 10, the toner may extremely hardly pass through the brush member 11, and the toner leakage is likely to occur. In a case where the contact area ratio is too small, the toner easily passes through the brush member 11, and it may not be possible to sufficiently apply normal polarity charges to the toner. In this case, there is a possibility that the non-normally charged toner may adhere to the charging roller 12 to which a bias voltage of a normal polarity is applied, and may contaminate the charging roller 12.

Therefore, the range of the contact area ratio that allows the passage of the normally charged toner with the normal polarity while applying normal polarity charges to the toner is preferably, for example, 18% or more and 74% or less.

Note that the peak pressure and the contact area ratio change in conjunction with each other. The peak pressure and the contact area ratio also change when the thickness, density, length, material, and the like of the hair of the brush member 11 are changed. However, even in a case where the hair and the like of the brush member 11 is changed, the actual contact state of the brush member 11 can be controlled by controlling the two parameters, the contact area ratio and the peak pressure, to appropriate values.

Configuration of Brush Member in Present Embodiment

Figure 10A:
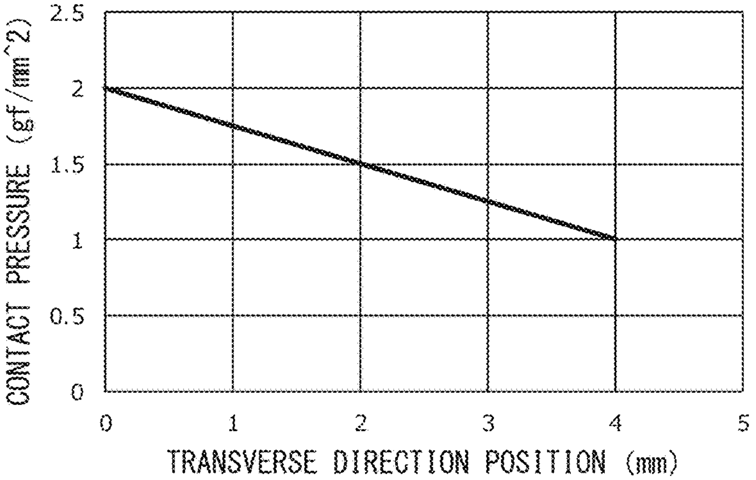
FIG. 10A is a graph illustrating a contact pressure and a contact area ratio of the brush member according to Example 1.
Figure 10B:
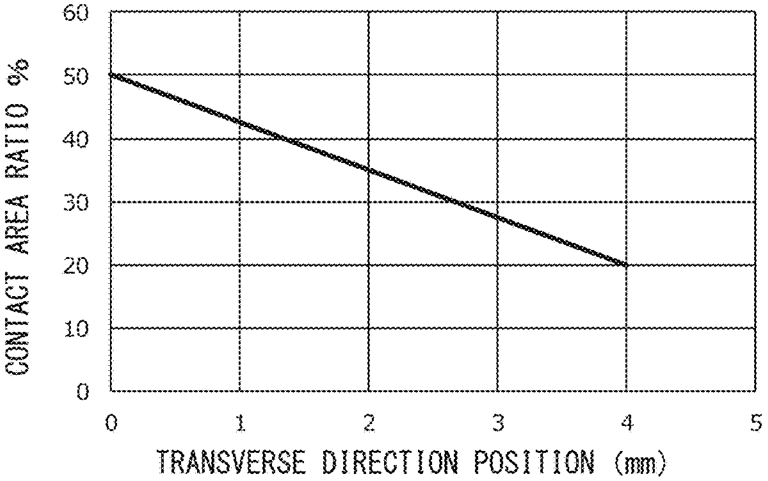
FIG. 10B is a graph illustrating a contact pressure and a contact area ratio of the brush member according to Example 1.
Figure 10C:
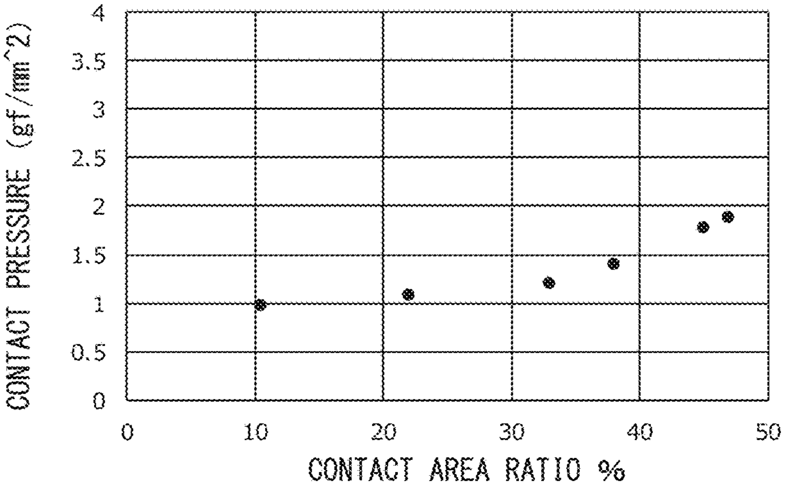
FIG. 10C is a graph illustrating a contact pressure and a contact area ratio of the brush member according to Example 1.

As described above, in Example 1, by disposing the brush member 11 in an inclined manner, the contact pressure is increased at the front end portion of the brush, and the contact pressure is decreased at the rear end portion of the brush. In Example 1, the contact pressure of the brush member 11 is 2 gf/mm^2 (peak pressure) at the front end portion of the brush and 1 gf/mm^2 at the rear end portion of the brush. The contact area ratio is 50% at the front end portion of the brush and 20% at the rear end portion of the brush. In this case, a relationship between a position in the transverse direction Y and a contact pressure of the brush member 11 is illustrated in FIG. 10A, and a relationship between a position in the transverse direction Y and a contact area ratio of the brush member 11 is illustrated in FIG. 10B, and a relationship between a contact pressure and a contact area ratio of the brush member 11 is illustrated in FIG. 10C. Here, the position of the brush member 11 in the transverse direction Y (the position in the transverse direction) represents how far the distance from the foremost front end to the rear end of the brush member 11 in the transverse direction Y is.

Brush Voltage

A power supply circuit (a brush power supply) serving as a voltage application unit is connected to the brush member 11. During image formation, a predetermined brush voltage (brush bias) is applied to the brush member 11. In the present example, a DC voltage of a normal polarity (a negative polarity) of the toner is applied to the brush member 11 as a brush voltage during image formation. The brush voltage during image formation is, for example, −350 V Note that the surface potential of the photosensitive drum 10 facing the brush member 11 is 0 V to −200 V during image formation. That is, the brush voltage is set such that the brush member 11 and the photosensitive drum 10 have a potential relationship in which the brush member 11 has a normal polarity (a negative polarity in the present example) of the toner. By setting the brush voltage in this manner, when the toner borne on the photosensitive drum 10 reaches a contact position of the brush member 11, normally charged toner is attracted toward the photosensitive drum 10, and non-normally charged toner is attracted toward the brush member 11.

Note that, rather than applying a brush voltage to the brush member 11, for example, the brush member 11 may be connected to a ground potential, or the brush member 11 may have a floating configuration electrically independent from an electric circuit in the image forming apparatus or a ground potential. Even in such a configuration, toner particles in contact with the brush member 11 roll between the brush member 11 and the photosensitive drum 10, so that the non-normally charged toner can be frictionally charged to the normal polarity.

Behavior of Toner in Brush Contact Portion

The behavior of the toner (transfer residual toner) in the contact portion between the brush member 11 and the photosensitive drum 10 will be described. The toner that has not been transferred from the photosensitive drum 10 to the sheet P in the transfer portion Tr is sent to the contact portion of the brush member 11 as the photosensitive drum 10 rotates. As described above, the brush member 11 is disposed such that the contact pressure increases at the front end portion of the brush on the upstream side in the rotation direction of the photosensitive drum 10. The larger the contact pressure is, the more the toner can be sufficiently charged to the normal polarity by rolling the toner between the brush member 11 and the photosensitive drum 10.

Figure 11A:
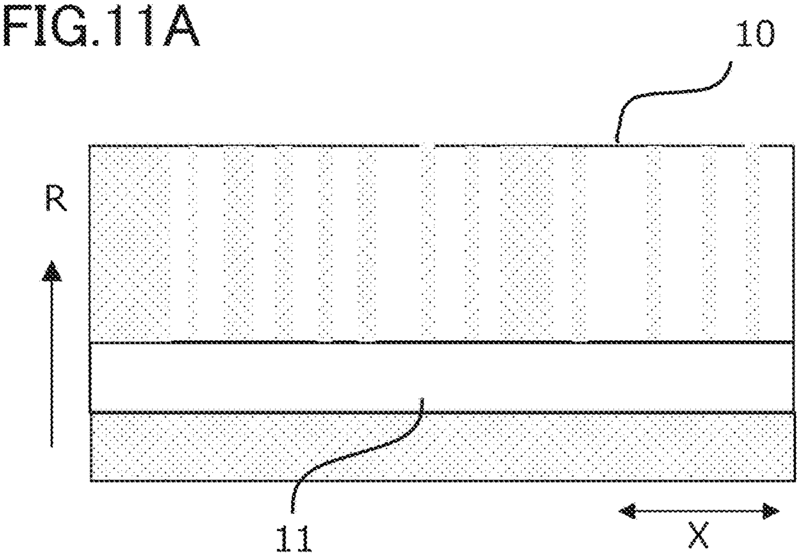
FIG. 11A is a view illustrating behavior of toner passing through the brush member.

Meanwhile, if the contact pressure is too high, the toner comes out of the brush member 11 in a streaky manner as illustrated in FIG. 11A. FIG. 11A is a view illustrating the photosensitive drum 10 and the brush member 11 as viewed from the upper side in FIG. 2. In FIG. 11A, a gray portion indicates that there is toner on the photosensitive drum 10, and a white portion indicates that there is no toner. FIG. 11A illustrates distribution of toner before and after passing through the brush member 11 in a case where an image is formed on an entire effective image area of a sheet P, such as halftone and solid black.

The reason why the toner comes out in a streaky manner as illustrated in FIG. 11A is that when the peak pressure of the brush member 11 is too high, the toner hardly passes through an area where the contact pressure is relatively high in the brush member 11 in the longitudinal direction X. On the other hand, in a portion where the contact pressure is relatively low in the brush member 11 in the longitudinal direction X, the toner tends to intensively pass through that portion. Since a portion through which the toner can pass and a portion through which the toner cannot pass are formed as described above, the toner has come out of the brush member 11 intensively in the portion through which the toner can pass, but appears in a streaky manner.

Figure 11B:
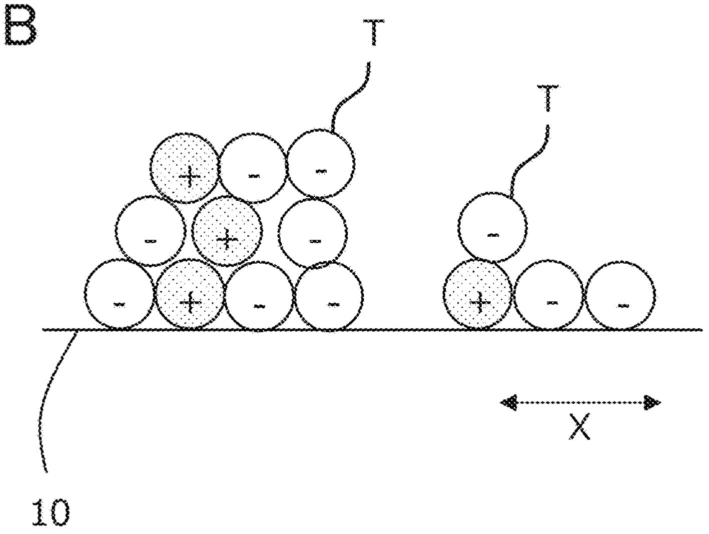
FIG. 11B is a view illustrating behavior of toner passing through the brush member.

The state of the toner T that has come out of the brush member 11 in a streaky manner will be described with reference to FIG. 11B. FIG. 11B schematically illustrates a state in which the surface of the photosensitive drum 10 is viewed in the transverse direction Y of the brush member 11 immediately after the toner comes out of the brush member 11. As described above, the toner T contains toner particles having a positive polarity (+), which is a non-normal polarity, due to the influence of the transfer voltage. Moreover, since the toner has come out of the brush member 11 in a streaky manner, the toner particles overlap in a mountainous manner. For this reason, in particular, toner particles having a non-normal polarity (+) in a lower portion of the toner particle pile are difficult to apply charges having a normal polarity (−) to, pass through the brush member 11, and are sent to the contact portion of the charging roller 12.

In the contact portion of the charging roller 12, some of the toner particles having the non-normal polarity (+) are charged to the normal polarity (−) due to discharge in a gap between the charging roller 12 to which a charging voltage is applied and the photosensitive drum 10. However, the toner particles having the non-normal polarity (+) in the lower portion of the pile of the toner T in the streaky form are hardly affected by the discharge.

Figure 11C:
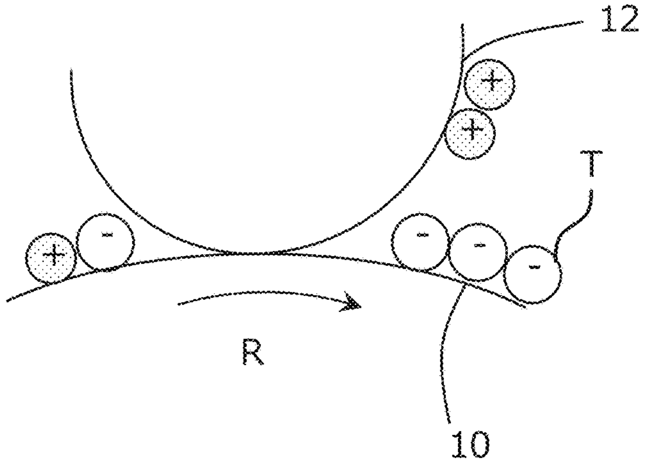
FIG. 11C is a view illustrating behavior of toner passing through the brush member.

The charging roller 12 has a negative potential with respect to the photosensitive drum 10. Therefore, as illustrated in FIG. 11C, the toner particles having the non-normal polarity (+) are attracted to the charging roller 12 and adhere to the surface of the charging roller 12. On the other hand, the toner particles having the normal polarity (−) are attracted toward the photosensitive drum 10, and pass through the contact portion of the charging roller 12 while being borne on the photosensitive drum 10.

The toner particles adhering to the charging roller 12 are held on the charging roller 12. The toner is accumulated on the charging roller 12 while the image forming apparatus 100 is used for a long period of time, and the discharge of the charging roller 12 is gradually hindered according to an increase in toner adhesion amount. If a charging failure occurs on the surface of the photosensitive drum 10 due to inhibition of discharge, the charging failure may appear as an image failure.

Therefore, it is preferable that the toner passing through the brush member 11 is charged to the negative polarity (−), which is a normal polarity, as much as possible, and is uniformly dispersed in the longitudinal direction X. In the present example, the foregoing state is realized by disposing the brush member 11 such that the contact pressure decreases from the front end portion toward the rear end portion. Hereinafter, the behavior of the toner passing through the brush member 11 in the present example will be described with reference to FIGS. 12A to 12D.

Figure 12A:
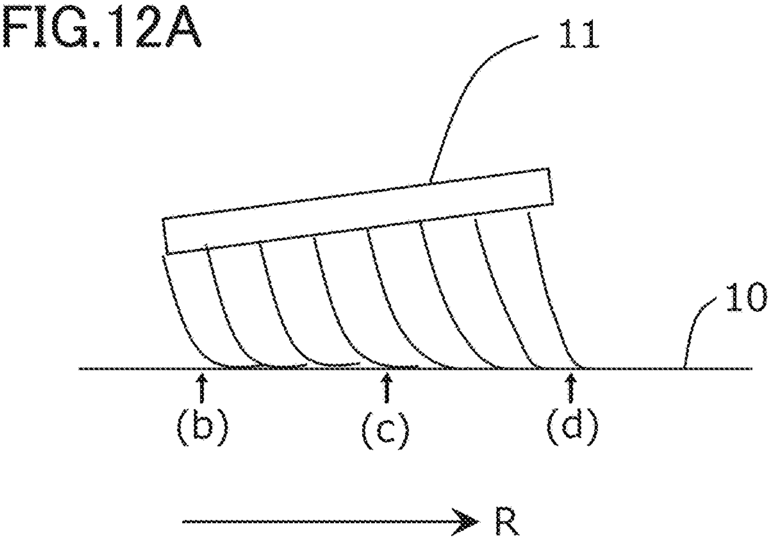
FIG. 12A is a view illustrating behavior of toner in the brush member according to Example 1.
Figure 12B:
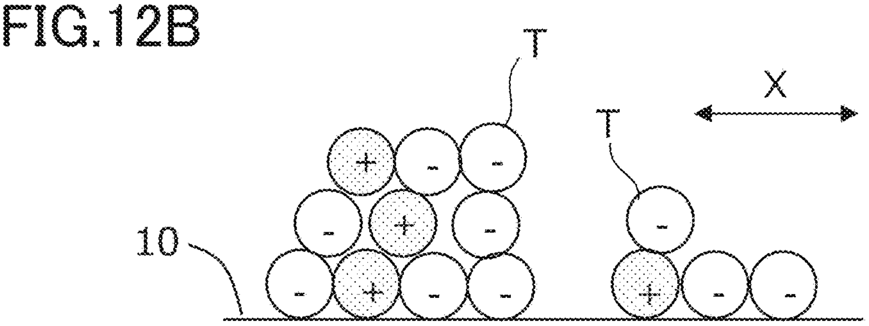
FIG. 12B is a view illustrating behavior of toner in the brush member according to Example 1.
Figure 12C:
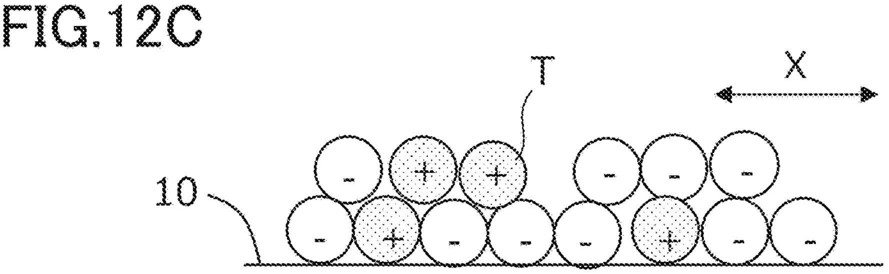
FIG. 12C is a view illustrating behavior of toner in the brush member according to Example 1.
Figure 12D:
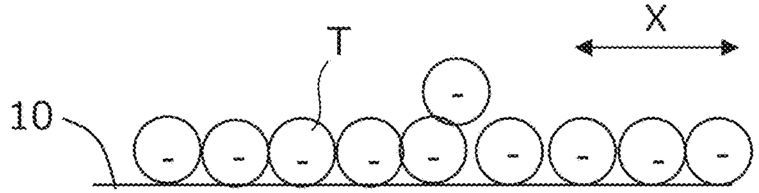
FIG. 12D is a view illustrating behavior of toner in the brush member according to Example 1.

FIG. 12A illustrates the contact portion between the brush member 11 and the photosensitive drum 10 according to the present example as viewed in the longitudinal direction X of the brush member 11 (the rotation axis direction of the photosensitive drum 10). FIGS. 12B, 12C, and 12D illustrate states in which the toner T adhering to the surface of the photosensitive drum 10 is viewed in the transverse direction Y of the brush member 11 (the rotation direction R of the photosensitive drum 10) at positions indicated by arrows (b), (c), and (d) illustrated in FIG. 12A, respectively.

As illustrated in FIG. 12B, since the contact pressure and the contact area ratio are high at the front end portion of the brush, the toner T intensively comes out of a portion where the contact pressure is relatively low. However, the contact pressure and the contact area ratio of the brush member 11 gradually decrease toward the rear end of the brush member 11. That is, as illustrated in FIGS. 12C and 12D, when the toner T moves toward the rear end of the brush member 11 as the photosensitive drum 10 rotates, an area through which the toner T can pass becomes the entire area in the longitudinal direction X. In addition, since the toner T randomly comes into contact with the conductive threads 11*a* of the brush member 11 as the photosensitive drum 10 rotates, the pile of the toner T becomes low, and the height of the toner T becomes more uniform in the longitudinal direction X. Furthermore, since the toner T rolls while the brush member 11 and the photosensitive drum 10 are in contact with each other as the photosensitive drum 10 rotates, charges having a normal polarity (−) are applied to the toner T.

Toner Leakage from End of Brush Member in Longitudinal Direction

Although the configuration of the brush member 11 in the image area has been described so far, the end of the brush member 11 in the longitudinal direction X will be focused on below.

Figure 19A:
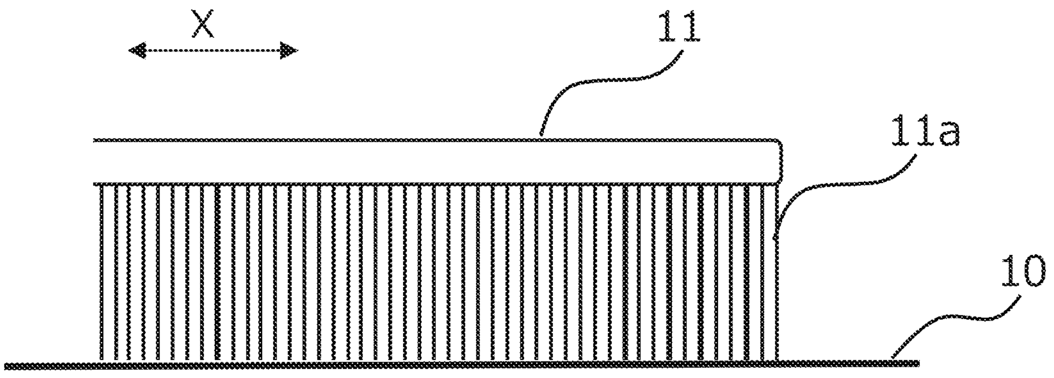
FIG. 19A is a view for explaining brush member according to a comparative example.

In a case where the brush member 11 is disposed downstream of the transfer portion Tr and upstream of the charging portion C in the rotation direction of the photosensitive drum 10 as in the present example, the toner may leak from both ends of the brush member 11 in the longitudinal direction X. The reason why the toner leaks from the ends in the longitudinal direction X will be described with reference to FIGS. 19A to 21. FIG. 19A is a view of a brush member 11 in a comparative example as viewed in the transverse direction Y FIG. 19B is a view of the brush member 11 in the comparative example as viewed in the longitudinal direction X.

Figure 19B:
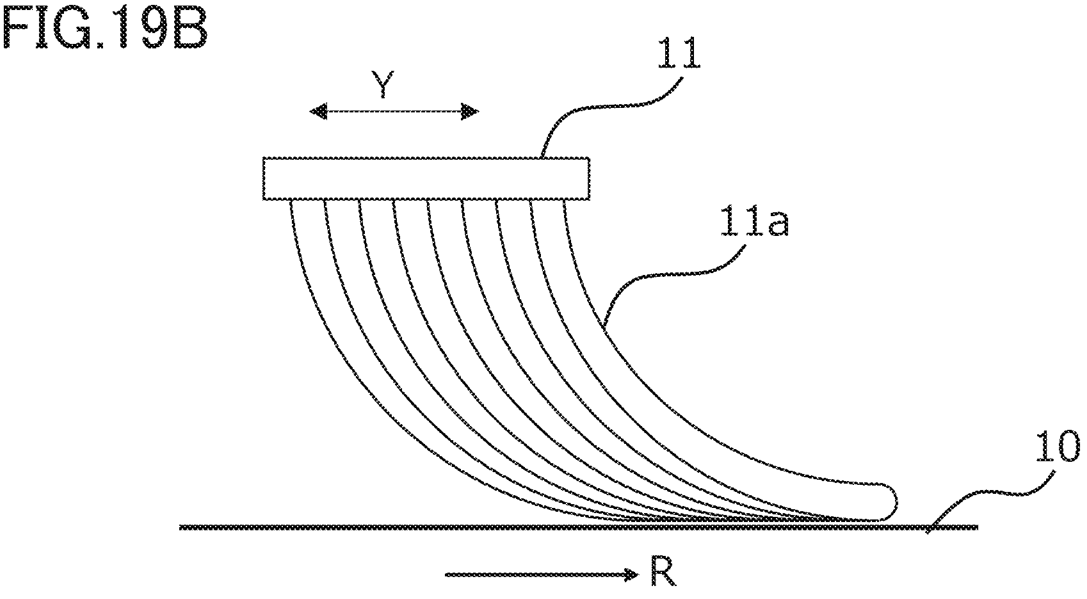
FIG. 19B is a view for explaining brush member according to the comparative example.

FIG. 19A illustrates a case where the brush member 11 is perpendicularly in contact with the photosensitive drum 10 when viewed in the transverse direction Y As illustrated in FIG. 19B, as viewed from the longitudinal direction X, a conductive threads 11*a* of the brush member 11 bends to flow along a rotation direction R of a photosensitive drum 10.

Figure 19C:
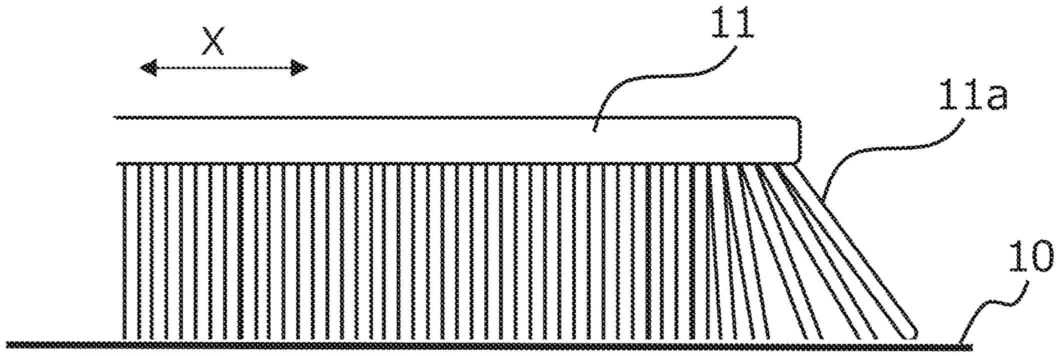
FIG. 19C is a view for explaining brush member according to the comparative example.

However, depending on how the brush member 11 is brought into contact, the conductive threads 11*a* spread outward at the end of the brush member 11 in the longitudinal direction X as illustrated in FIG. 19C. This is likely to occur, for example, in a case where the conductive threads 11*a* slide in the longitudinal direction X with respect to the surface of the photosensitive drum 10 when the brush member 11 is attached. When the conductive threads 11*a* spread outward at the end in the longitudinal direction X, the substantial density of the brush is lowered.

Each of FIGS. 20A to 20D schematically illustrates a contact state of the brush member 11 on the surface of the photosensitive drum 10. In FIGS. 20A to 20D, each circle represents an area having the highest contact pressure among areas where individual thread of the conductive threads 11*a* are in surface contact with the photosensitive drum 10. In FIGS. 20A to 20D, gray indicates toner T. Each of FIGS. 20A to 20D illustrates an area (image area) corresponding to the opening range of the developing opening 20*a* in the longitudinal direction X.

Figure 20A:
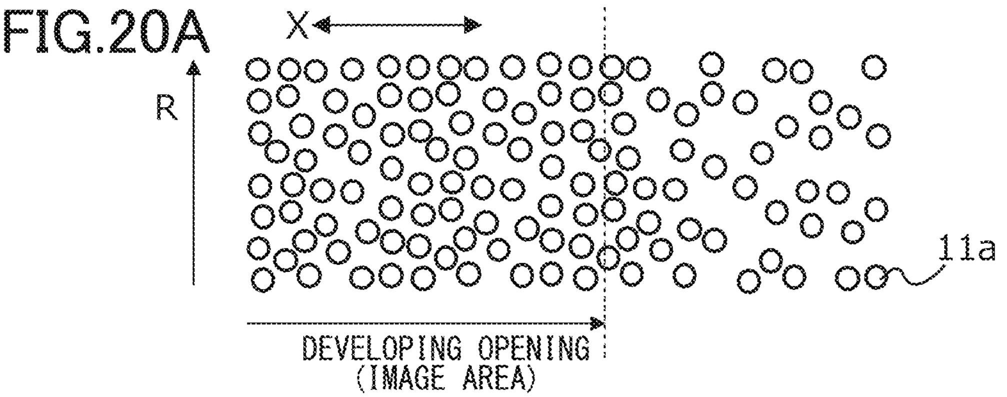
FIG. 20A is a view illustrating behavior of toner in the brush members according to the comparative example.
Figure 20B:
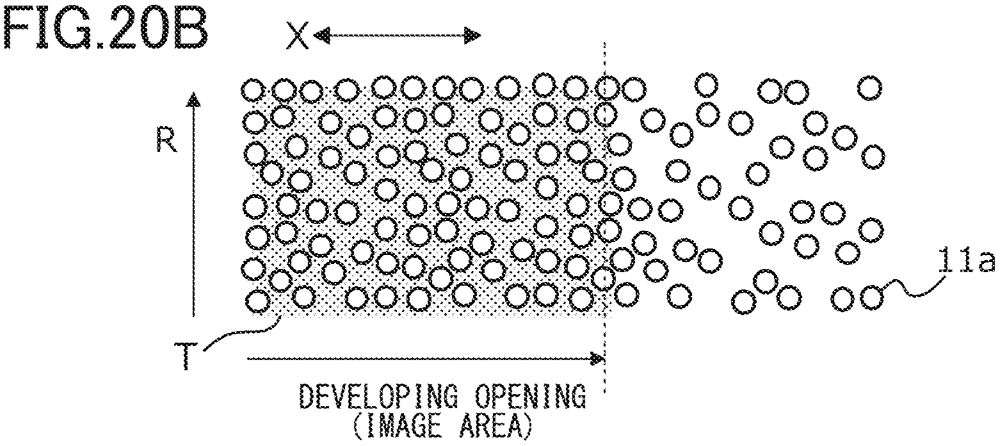
FIG. 20B is a view illustrating behavior of toner in the brush members according to the comparative example.

FIG. 20A illustrates a state in which the toner has not yet reached the contact position of the brush member 11 (a state in which the brush member 11 is new). FIG. 20B illustrates a state in which the brush member 11 is used and the toner T is accumulated in the brush member 11 to some extent. In this case, the toner T accumulated in the brush member 11 basically remains in an image area corresponding to the developing opening 20*a*, which is an area where the toner is borne, on the developing roller 25.

Figure 20C:
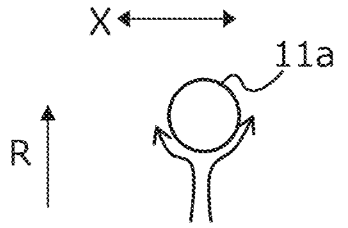
FIG. 20C is a view illustrating behavior of toner in the brush members according to the comparative example.
Figure 20D:
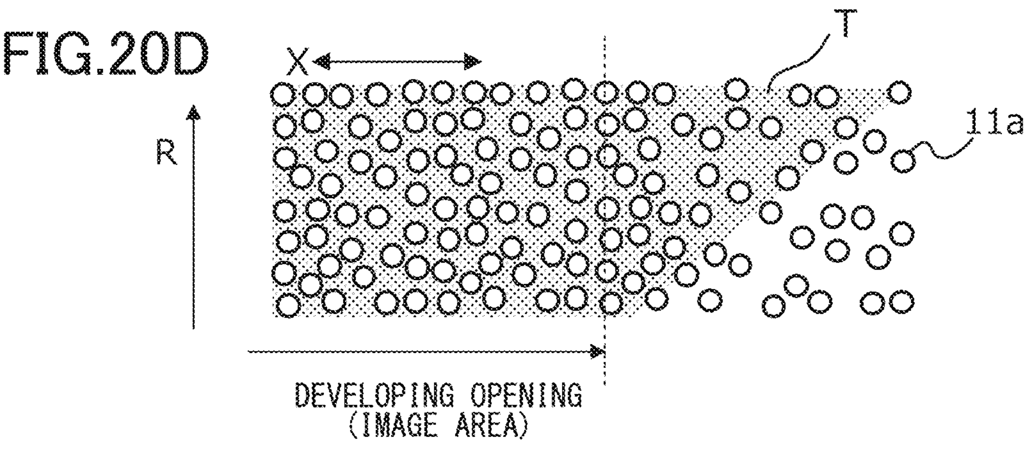
FIG. 20D is a view illustrating behavior of toner in the brush members according to the comparative example.

When the toner T is further accumulated in the brush member 11, the toner T moves to spread in the longitudinal direction X toward the outside of the image area (referred to as lateral movement). This is because, as illustrated in FIG. 20C, when the toner T collides with the conductive threads 11*a* of the brush member 11, the toner T flows while avoiding the conductive threads 11*a* in one of the longitudinal directions X. As described above, in a state where the conductive threads 11*a* spread outward at the end in the longitudinal direction X and the substantial density of the brush decreases (FIG. 19C), the toner T tends to flow to the outside in the longitudinal direction X where the density of the brush is lower (that is, the conductive threads 11*a* are sparse). As a result, as illustrated in FIG. 20D, the toner T laterally moves toward the end in the longitudinal direction X in the brush member 11. In particular, since there is no conductive thread 11*a* that blocks the toner T at the outer end of the brush member 11 in the longitudinal direction X, the toner T that has reached the outer end leaks from the brush member 11.

Figure 21:
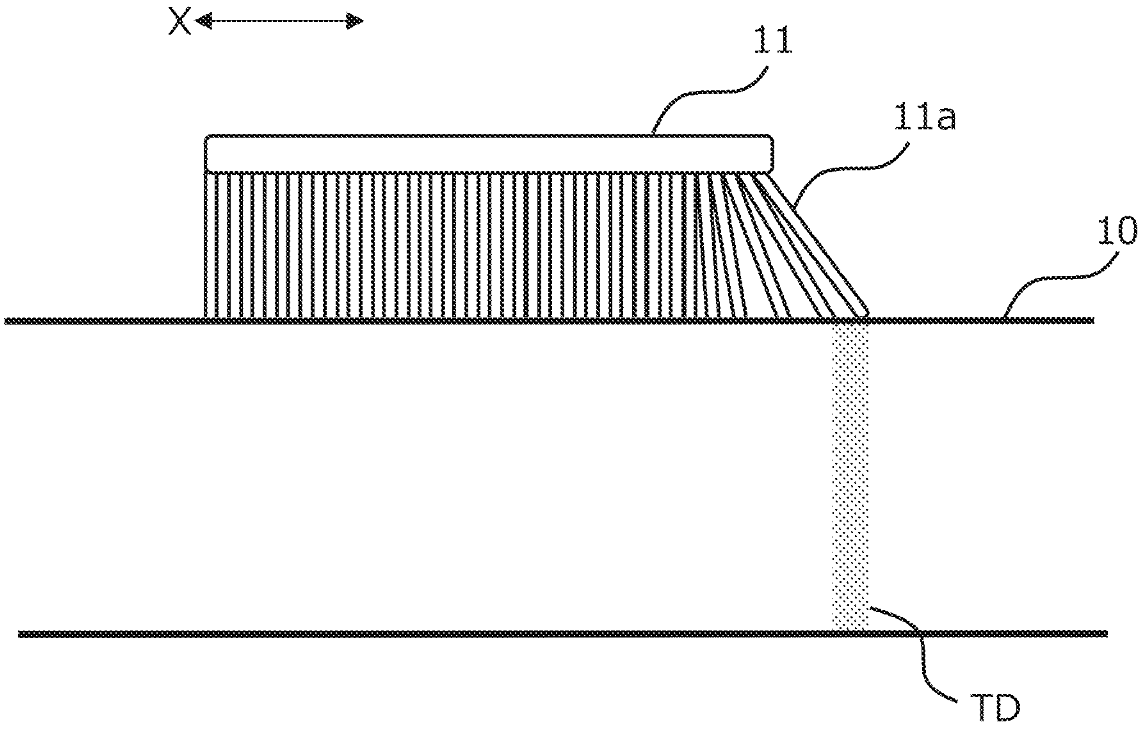
FIG. 21 is a view illustrating toner leakage occurring in the brush member according to the comparative example.

When the toner leaking from the end of the brush member 11 remains on the photosensitive drum 10, toner dirt TD is formed in a streaky manner over the entire circumference of the photosensitive drum 10 as illustrated in FIG. 21. When the toner dirt TD is accumulated, there is a concern that, for example, the toner dirt TD is peeled off from the photosensitive drum 10 and contaminates the inside of the image forming apparatus 100.

In addition, in a case where the toner dirt TD adhering to the photosensitive drum 10 is in contact with the above-described contact member 31 that regulates an inroad amount of the developing roller 25 against the photosensitive drum 10, the toner is rubbed against the contact member 31 and fused to the surface of the contact member 31. Due to this fused material, the distance (inter-axial distance) between the developing roller 25 and the photosensitive drum 10 may become non-uniform depending on a rotation angle of the developing roller 25. In the present example, an inroad amount of the developing roller 25 against the photosensitive drum 10 cannot be uniformly controlled. In this case, there is a possibility that an image defect (referred to as banding) in which density unevenness occurs in the developed toner image may appear.

Configuration of End of Brush Member in Longitudinal Direction

Figure 1:
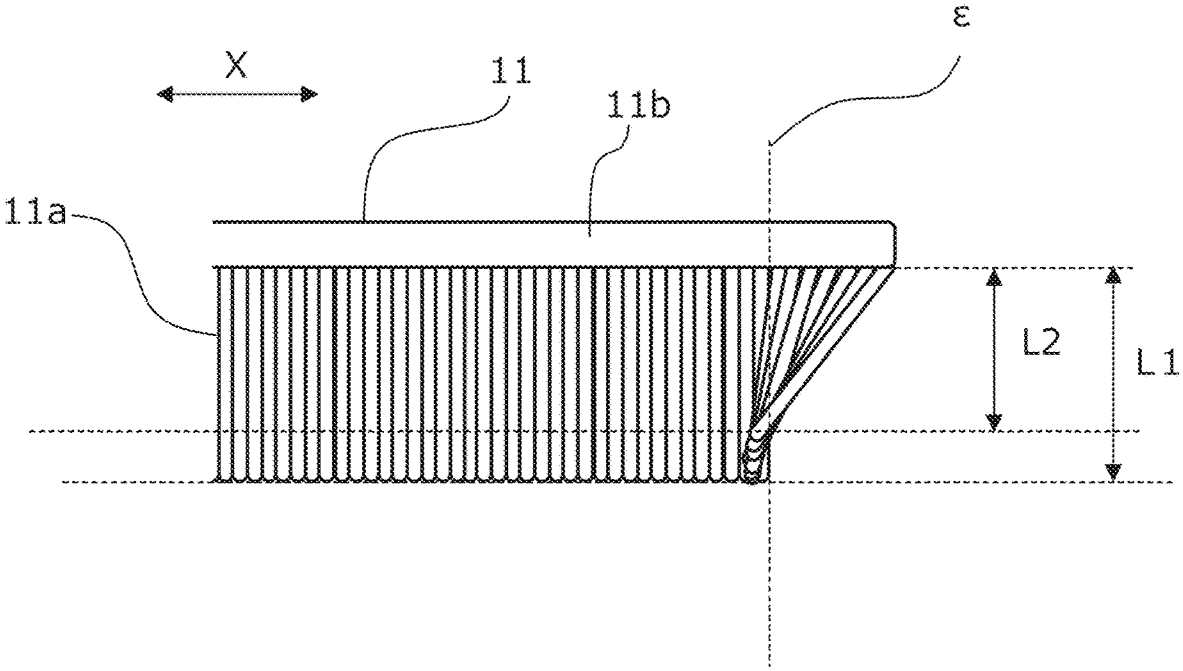
FIG. 1 is a view illustrating a brush member according to Example 1.

In the present example, in order to reduce leakage of residual toner from an end of the brush member 11, the conductive threads 11*a*, which serve as hair (brush portion) of the brush member 11, is fallen to be inclined toward the center in the longitudinal direction X at the end of the brush member 11 as illustrated in FIG. 1. By falling the conductive threads 11*a* at the end toward the center, the density of the brush, that is, the contact area ratio, increases at a brush-fallen boundary ε in FIG. 1.

Here, the brush-fallen boundary ε represents a position in the longitudinal direction X of the distal ends of the conductive threads 11*a* at the outer end when the conductive threads 11*a* at the outer end in the longitudinal direction X is fallen toward the center in the longitudinal direction X to an angle at which the inroad amount with respect to the photosensitive drum 10 becomes exactly 0.

In the present example, a portion having a high contact area ratio of the brush member 11 is concentrated substantially at one position (brush-fallen boundary ε) in the longitudinal direction X. The brush-fallen boundary ε according to the present example is an example of an inner end of the portion where the contact area ratio is high of the brush member in the rotation axis direction of the photosensitive drum 10. Note that, when the contact area ratio of the brush member 11 is increased over a certain range in the longitudinal direction X by loosening the angle at which the conductive threads 11*a* are fallen or the like, the inner end in the longitudinal direction X of the portion where the contact area ratio is higher than that in the image area may be set as a brush-fallen boundary ε.

The conductive threads 11*a* located outside the brush-fallen boundary ε in the longitudinal direction X are fallen such that the distal ends of the conductive threads 11*a* are directed toward the brush-fallen boundary ε. That is, in the present example, the portion where the contact area ratio is high of the brush member 11 is formed such that some of the hair of the brush member 11 is inclined toward the center of the brush member 11 in the rotation axis direction of the photosensitive drum 10. In the present example, the conductive threads 11*a* are inclined such that the inclination angle of the conductive threads 11*a* with respect to a direction perpendicular to the base cloth 11*b* increases toward the outside in the longitudinal direction X from the brush-fallen boundary ε. As a result, the contact area ratio of the brush member 11 at the brush-fallen boundary ε can be locally increased. Note that, in the present example, the conductive threads 11*a* located inside the brush-fallen boundary ε in the longitudinal direction X are not fallen in the longitudinal direction X, and extend perpendicularly to the base cloth 11*b* when viewed in the transverse direction Y.

As a method of falling the conductive threads 11*a* located outside the brush-fallen boundary ε, for example, a heated metal plate is pressed against the conductive threads 11*a* using the thermoplasticity of the conductive threads 11*a*. In this case, the conductive threads 11*a* can be fallen in a uniform direction and at a uniform angle.

By falling the conductive threads 11*a* located outside the brush-fallen boundary ε toward the center in the longitudinal direction X, the contact area ratio of the brush member 11 at the brush-fallen boundary ε is higher than the contact area ratio of the brush member 11 in the image area. In the present example, the contact area ratio of the brush member 11 at the brush-fallen boundary ε was 80%. When the brush member 11 is disposed to be inclined with respect to the photosensitive drum 10 as in the present example (FIG. 12A), the contact area ratio in the image area and the contact area ratio at the brush-fallen boundary ε are based on the contact area ratio at the front end portion of the brush where the inroad amount of the brush member 11 is largest.

The contact area ratio at the brush-fallen boundary ε may be higher than the contact area ratio in the image area, and a value of the contact area ratio at the brush-fallen boundary ε may be, for example, preferable 65% or more, more preferably 70% or more, and still more preferably 80% or more as in the present example. When the contact area ratio at the brush-fallen boundary ε is higher than the contact area ratio in the image area, it is possible to reduce leakage of toner from the end of the brush member 11 in the longitudinal direction due to the lateral flow of the toner blocked by the brush member 11 as will be described below.

Although the configuration in which the conductive threads 11*a* located in the outermost area of the brush member 11 in the longitudinal direction X are fallen is exemplified in the present example, the position where the conductive threads 11*a* (hair) are fallen is not limited to this area. As long as it is outside the image area, a portion having a higher contact area ratio than the inside of the image area by falling the conductive threads 11*a* may be provided in a portion of an area inside the outermost area of the brush member 11. That is, according to the present example or a modification thereof, it is possible to reduce the possibility that the toner blocked by the brush member 11 laterally flows in the longitudinal direction X and the toner leaks locally and intensively from a portion (e.g., an end in the longitudinal direction X) of the brush member 11.

Toner Behavior at Brush-Fallen Boundary

Next, the behavior of toner at the brush-fallen boundary ε in the brush member 11 according to the present example will be described with reference to FIGS. 13A to 13D. Each of FIGS. 13A to 13D schematically illustrates a contact state of the brush member 11 on the surface of the photosensitive drum 10. In FIGS. 13A to 13D, a circle represents the conductive threads 11*a* in contact with the photosensitive drum 10. In FIGS. 13A to 13D, gray indicates toner T.

Figure 13A:
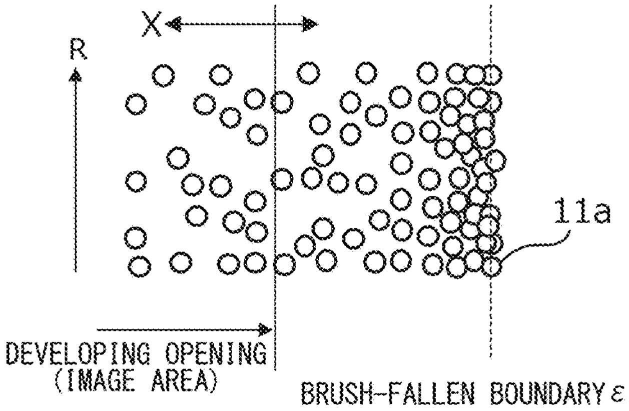
FIG. 13A is a view illustrating behavior of toner in the brush member according to Example 1.
Figure 13B:
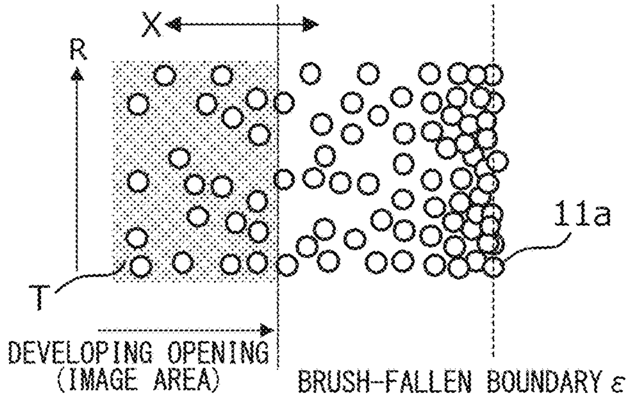
FIG. 13B is a view illustrating behavior of toner in the brush member according to Example 1.

FIG. 13A illustrates a state in which the toner has not yet reached the contact position of the brush member 11 (a state in which the brush member 11 is new). FIG. 13B illustrates a state in which the brush member 11 is used and the toner T is accumulated in the brush member 11 to some extent. In this case, the toner T accumulated in the brush member 11 basically remains in an image area, which is an area where the toner T is borne on the developing roller 25 (that is, an area where the toner T is supplied from the developing roller 25 to the photosensitive drum 10 during image formation).

Figure 13C:
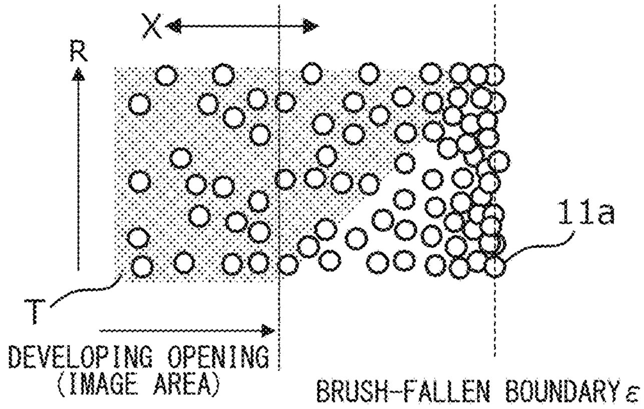
FIG. 13C is a view illustrating behavior of toner in the brush member according to Example 1.

When the toner T is further accumulated in the brush member 11, the toner T laterally moves outward of the image area (FIG. 13C). This is because, as described above, when the toner T collides with the conductive threads 11*a* of the brush member 11, the toner T flows while avoiding the conductive threads 11*a* in one of the longitudinal directions X.

Figure 13D:
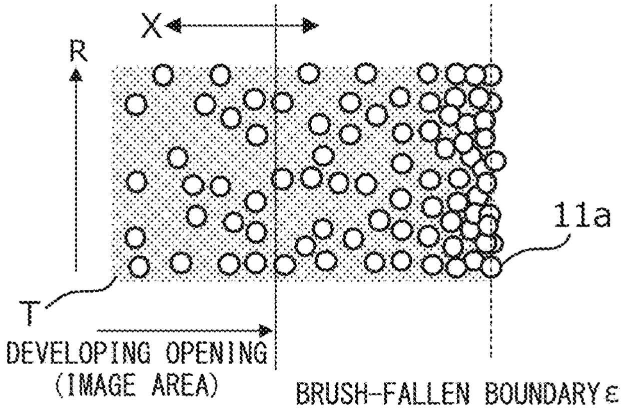
FIG. 13D is a view illustrating behavior of toner in the brush member according to Example 1.

However, in the present example, unlike the comparative example, the contact area ratio at the brush-fallen boundary ε located outside the image area is high, and a gap between the conductive threads 11*a* is small. Therefore, the toner T is prevented from laterally moving outside the brush member 11 in the longitudinal direction X beyond the brush-fallen boundary ε. As a result, as illustrated in FIG. 13D, even if the amount of the toner T accumulated in the brush member 11 increases, the toner T remains in an area inside the brush-fallen boundary ε in the longitudinal direction X. The state in FIG. 13D is basically a stable state in which the toner T (transfer residual toner) generated in the transfer portion during image formation is supplied to the brush member 11 and the toner T in an amount corresponding to newly supplied toner T passes through the brush member 11 in the image area.

Position of Brush-Fallen Boundary in Longitudinal Direction

Figure 14A:
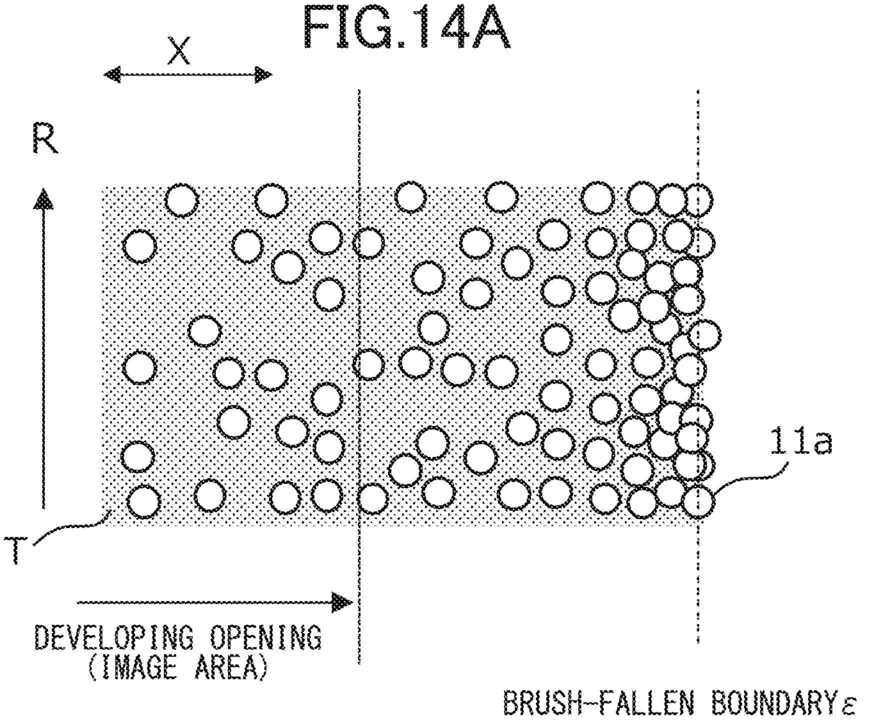
FIG. 14A is a view illustrating behavior of toner in the brush member according to Example 1.
Figure 14B:
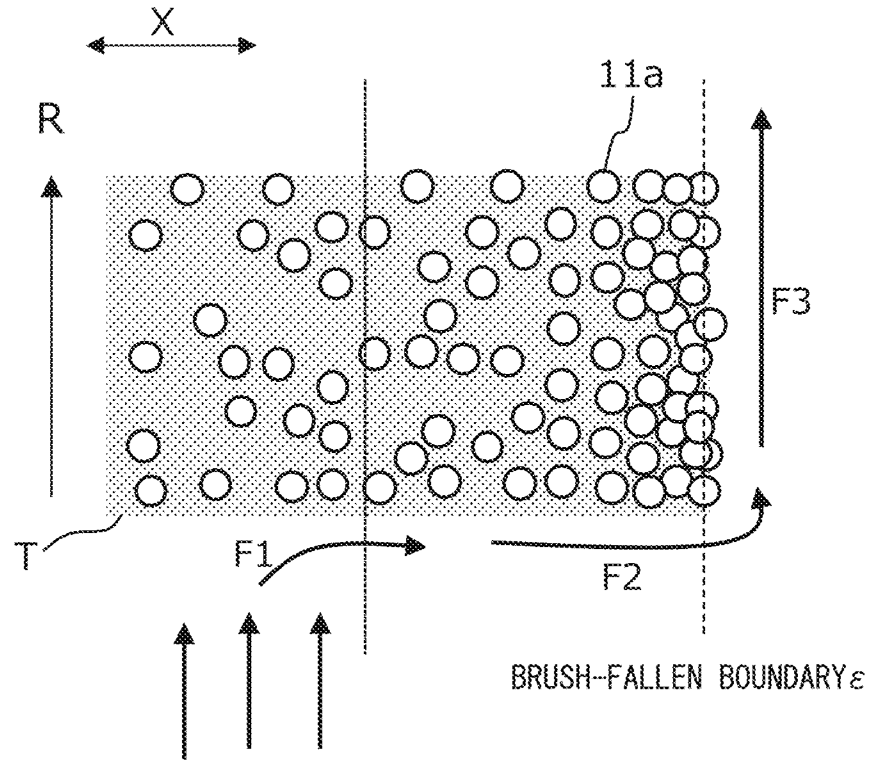
FIG. 14B is a view illustrating behavior of toner in the brush member according to Example 1.

The toner leakage from the brush member 11 can be reduced by increasing the contact area ratio of the brush member 11 at the brush-fallen boundary ε as described above, but toner leakage may occur when more than normal transfer residual toner is generated. For example, in a case where the image forming apparatus 100 has a very long lifespan, transfer residual toner may easily be generated in the latter half of the usage period due to a decrease in transfer efficiency or the like. As illustrated in FIG. 14A, it is assumed that, in a state where toner T is sufficiently accumulated in the entire area inside the brush-fallen boundary ε of the brush member 11, transfer residual toner is generated in an amount larger than the amount of toner that can pass through the brush member 11 per unit time. In this case, as illustrated in FIG. 14B, the transfer residual toner mainly generated in the image area and reaching the brush member 11 hits the front end portion of the brush member 11 and laterally moves (arrow F1). Since the toner T is also accumulated in an area outside the image area, the transfer residual toner further laterally moves (arrow F2), and finally leaks out of the brush-fallen boundary ε (the outer end of the brush member 11) (arrow F3).

That is, when more transfer residual toner than usual is generated, it may be difficult to avoid toner leakage from the brush member 11. Even in such a case, it is preferable to set the position of the brush-fallen boundary ε such that at least an occurrence of an image defect can be suppressed.

Here, as described above, since the contact area ratio and the contact pressure of the brush member 11 are lower on the downstream side than on the upstream side of the photosensitive drum 10 in the rotation direction, the toner that has come out of the front end portion of the brush member 11 more easily moves in the transverse direction than in the longitudinal direction of the brush member 11. That is, the movement of the toner that has reached the brush member 11 in the longitudinal direction is blocked at the brush-fallen boundary ε, and the toner does not move much in the longitudinal direction and passes through the contact area between the brush member 11 and the photosensitive drum 10 in the transverse direction after passing through the front end portion of the brush member 11. In this manner, by combining the blocking effect in the longitudinal direction and the height difference in contact area ratio or contact pressure in the transverse direction (the density of the brush portion), it is possible to more effectively reduce toner leakage to the outside of the brush-fallen boundary ε.

As illustrated in FIG. 15, the brush-fallen boundary ε is preferably located outside the image area in the longitudinal direction X. As a result, since the brush-fallen boundary ε is outside the image area in the longitudinal direction X, it is possible to prevent transfer residual toner from leaking out of the brush-fallen boundary ε in the image area even when more transfer residual toner than usual is generated as described above. Note that, as described above, the image area according to the present example is an area inside the end seal 30 that seals the developing opening 20*a* (FIG. 3) in the longitudinal direction X such that the toner in the developing container is kept from leaking out of the developing container.

The brush-fallen boundary ε is preferably located outside an outer end X1 of the end seal 30 in the longitudinal direction X. This is because, if the brush-fallen boundary ε is located inside the outer end X1 of the end seal 30, when more transfer residual toner than usual is generated, there is a possibility that the toner leaking from the outside of the brush-fallen boundary ε enters the end seal 30, resulting in a deterioration in sealing function of the end seal 30.

On the other hand, the brush-fallen boundary ε is preferably located inside an outer end X2 of the outer circumferential surface of the developing roller 25 in the longitudinal direction X. This is because, if the brush-fallen boundary ε is outside the outer end X2 of the outer circumferential surface of the developing roller 25, there is a possibility that most of the toner leaking from the outside of the brush-fallen boundary ε is accumulated on the photosensitive drum 10, and the toner eventually scatters from the photosensitive drum 10 and contaminates the inside of the image forming apparatus.

In the present example, the contact member 31 that regulates an inroad amount of the developing roller 25 against the photosensitive drum 10 is provided outside the outer circumferential surface of the developing roller 25 in the longitudinal direction X. When the toner leaking from the outside of the brush-fallen boundary ε reaches the contact member 31, there is a possibility that the toner may fuse to the contact member 31, causing the above-described banding. Therefore, the brush-fallen boundary ε is preferably located inside the outer end X2 of the outer circumferential surface of the developing roller 25, that is, inside an inner end of the contact member 31 in the longitudinal direction X.

In the present example, the outer circumferential surface of the developing roller 25 and the contact member 31 are adjacent to each other, and the outer end X2 of the outer circumferential surface is located at the same position as the inner end of the contact member 31. However, the outer circumferential surface of the developing roller 25 and the contact member 31 may be separated from each other in the longitudinal direction X. Even in that case, the brush-fallen boundary ε is preferably located inside the outer end X2 of the outer circumferential surface of the developing roller 25 and inside the inner end of the contact member 31 in the longitudinal direction X.

By setting the position of the brush-fallen boundary ε as described above, the possibility of occurrence of inconvenience such as an image defect can be reduced as much as possible even when more transfer residual toner than usual is generated.

Experiments for Verification

Experiments were conducted to verify whether the configuration according to the present example is capable of reducing toner leakage from the brush member 11. In a comparative example, the contact area ratio at the end of the brush member 11 was equal to or smaller than the contact area ratio in the image area. Specifically, in Comparative Example 1, the conductive threads 11*a* are not fallen at the end thereof at the time of manufacturing the brush member 11, and the conductive threads 11*a* do not spread outward at the end thereof in a state where the conductive threads 11*a* are in contact with the photosensitive drum 10 (FIG. 19A). In Comparative Example 2, the conductive threads 11*a* are not fallen at the end thereof at the time of manufacturing the brush member 11, and the conductive threads 11*a* spread outward at the end thereof in a state where the conductive threads 11*a* are in contact with the photosensitive drum 10 (FIG. 19C).

In each of the experiments for verification, it was confirmed whether a banding image occurred due to toner leakage from the brush member 11. In a high-temperature and high-humidity environment (temperature: 30° C./humidity: 80%) in which toner is easily fused to the contact member 31 as an experimental environment, two horizontal line images with a 2% coverage rate were continuously passed intermittently, and the number of halftone image samples in which banding occurred was confirmed. The experimental results are shown in Table 1.

TABLE 1

| | Contact area ratio at leading edge portion | | Number of sheets where bending |
|---|---|---|---|
| | Central portion | End portion | occurred |
| Example 1 | 50% | 80% | 55100 |
| Comparative example 1 | 50% | 50% | 45000 |
| Comparative example 2 | 50% | 30% | 15000 |

As can be seen from Table 1, it was found that occurrence of banding can be suppressed by the configuration of Example 1 as compared with Comparative Examples 1 and 2.

As described above, the brush member 11 according to the present example has a portion (a brush-fallen boundary ε) which is outside the image area in the longitudinal direction X and in which a contact area ratio is higher than a contact area ratio in the image area. With this configuration, toner leakage from the brush member 11 can be reduced. In addition, it is possible to reduce the possibility of occurrence of inconveniences such as scattering of toner dirt and image defects (banding) caused by the toner leakage from the brush member 11.

The brush member 11 according to the present example has a portion (a brush-fallen boundary ε) which is outside the image area in the longitudinal direction X and in which part of the hair (the conductive threads 11*a*) of the brush member 11 is inclined toward the center of the brush member 11 in the rotation axis direction (the longitudinal direction X) of the photosensitive drum 10. With this configuration, in the contact portion between the brush member 11 and the photosensitive drum 10, the density of the hair (the conductive threads 11*a*) is high locally in the vicinity of the brush-fallen boundary ε, making it possible to reduce toner leakage from the brush member 11. In addition, it is possible to reduce the possibility of occurrence of inconveniences such as scattering of toner dirt and image defects (banding) caused by the toner leakage from the brush member 11.

Example 2

As Example 2, an example of a configuration in which the density of the hair at the end of the brush member 11 is increased will be described. The brush member 11 according to the present example can be used, instead of the brush member 11 according to Example 1, in the image forming apparatus 100 described in Example 1. Hereinafter, unless otherwise specified, elements denoted by the same reference signs as those in Example 1 have substantially the same configurations and functions as those described in Example 1, and differences from Example 1 will be mainly described.

Configuration of Brush Member

Figure 16A:
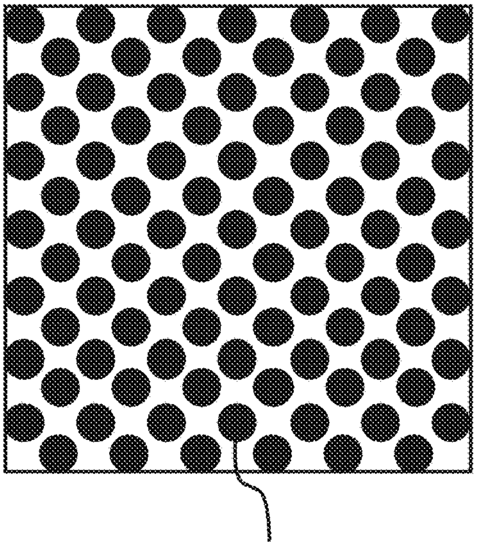
FIG. 16A is a view for explaining a brush member according to Example 2.
Figure 16B:
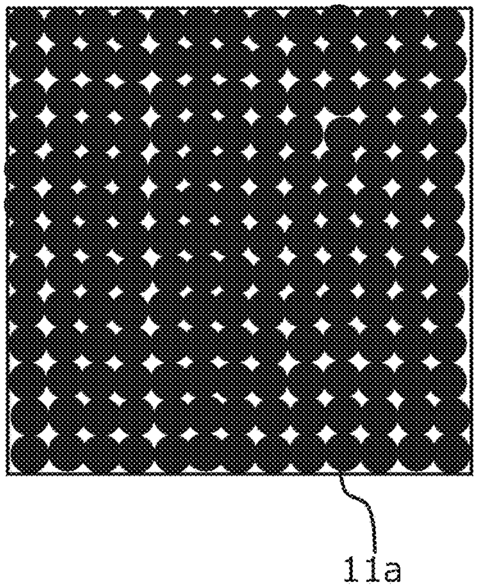
FIG. 16B is a view for explaining the brush member according to Example 2.

FIGS. 16A and 16B are views each schematically illustrating a state in which the brush member 11 is observed from the distal end side of the conductive threads 11*a* as hair in Example 2. FIG. 16A shows a portion of the brush member 11 in the image area, and FIG. 16B shows a portion of the brush member 11 in an end area 11E outside the image area in the longitudinal direction X. Black circles in FIGS. 16A and 16B represent the conductive threads 11*a*.

As illustrated in FIGS. 16A and 16B, in the present example, the density of the conductive threads 11*a* in the end area 11E outside the image area is higher than the density of the conductive threads 11*a* in the image area. In the present example, for example, the density of the conductive threads 11*a* in the end area 11E is 360 kF/inch^2, and the density of the conductive threads 11*a* in the image area is 240 kF/inch^2. The thickness of the conductive threads 11*a* is 2 denier in common in the image area and the end area 11E.

Figure 16C:
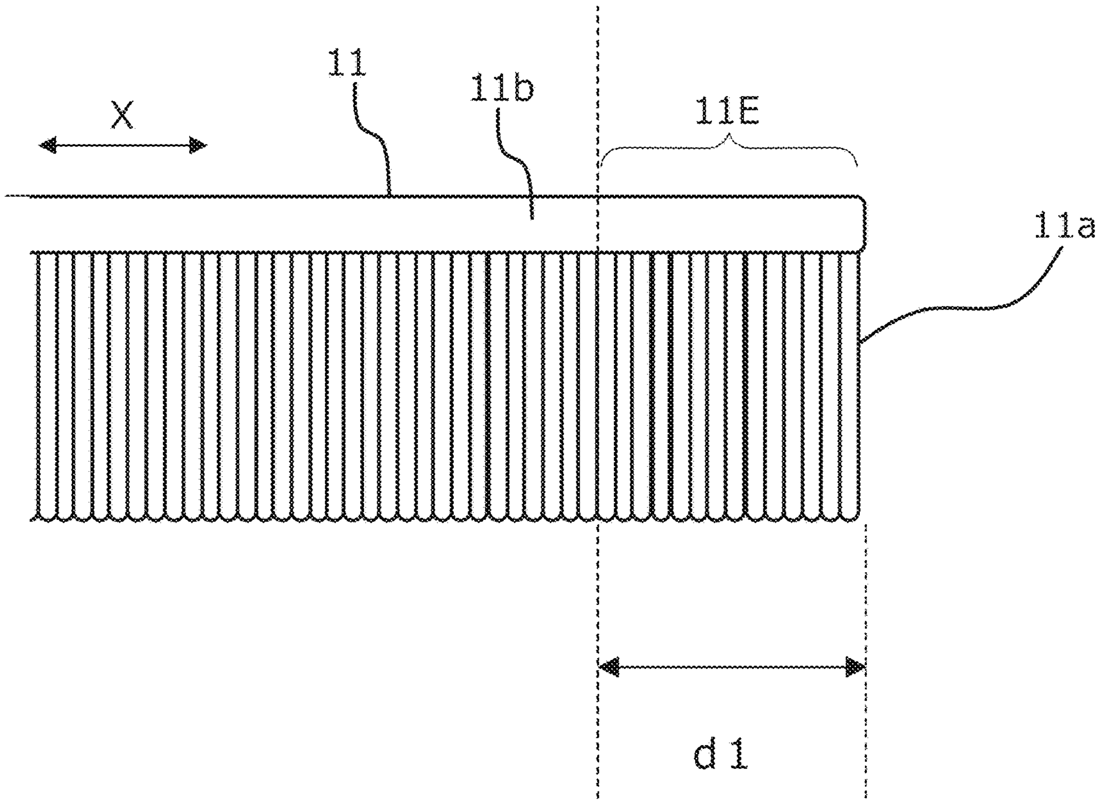
FIG. 16C is a view for explaining the brush member according to Example 2.

As illustrated in FIG. 16C, an inner end of the end area 11E in the longitudinal direction X (a position where the density of the conductive threads 11*a* is changed) is defined as a brush density boundary ε2. In the present example, a length of the brush member 11 in the longitudinal direction X is 236 mm, and a distance d1 in the longitudinal direction X from the outer end of the brush member 11 in the longitudinal direction X to the brush density boundary ε2 is 3 mm. That is, the width of the end area 11E in the longitudinal direction X is 3 mm.

In the present example, the contact area ratio of the brush member 11 was 50% in the image area and 80% in the end area 11E. As described above, by providing an area (an end area 11E) having a high contact area ratio outside the image area in the longitudinal direction X, toner leakage from the brush member 11 can be reduced.

Note that the Clark Evans Index w of the brush member 11 is preferably w≥1 as in Example 1. In addition, the inroad amount of the brush member 11 against the photosensitive drum 10, the inclination angle β of the brush member 11 with respect to the photosensitive drum 10, and the like can be set to the same values as those exemplified in Example 1.

Position of Brush Density Boundary in Longitudinal Direction

A preferable position of the brush density boundary ε2 will be described. The brush density boundary ε2 according to the present example is an example of an inner end of the portion where the contact area ratio is high of the brush member in the rotation axis direction of the photosensitive drum 10.

As described in Example 1, when more transfer residual toner than usual is generated, it may be difficult to avoid toner leakage from the brush member 11. Even in such a case, it is preferable to set the position of the brush density boundary ε2 such that at least an occurrence of an image defect can be suppressed.

The brush density boundary ε2 is preferably located outside an outer end X1 of the end seal 30 in the longitudinal direction X. Further, the brush density boundary ε2 is preferably located inside an inner end of the contact member 31 in the longitudinal direction X. In addition, the brush density boundary ε2 is preferably located inside an outer end X2 of the outer circumferential surface of the developing roller 25 in the longitudinal direction X.

By setting the position of the brush density boundary ε2 as described above, the possibility of occurrence of inconvenience such as an image defect can be reduced as much as possible even when more transfer residual toner than usual is generated.

Note that, although the entire area from the brush density boundary ε2 to the outer end of the brush member 11 in the longitudinal direction X is set as the end area 11E, which is an area where the contact area ratio is high (an area where the density of the conductive threads 11*a* is high) in the present example, the brush member 11 is not limited thereto. The brush member 11 may have a portion having a higher contact area ratio (a portion where the density of the conductive threads 11*a* is higher) than the image area in at least a portion of the area outside the image area in the longitudinal direction X.

Experiments for Verification

Experiments were conducted to verify whether the configuration according to the present example is capable of reducing toner leakage from the brush member 11. In a comparative example, the contact area ratio at the end of the brush member 11 was equal to or smaller than the contact area ratio in the image area. The specific Comparative Examples 1 and 2 and the specific method of experimental verification are the same as those described in Example 1. The experimental results are shown in Table 2.

TABLE 2

| | Contact area ratio at leading edge portion | | Number of sheets where bending |
|---|---|---|---|
| | Central portion | End portion | occurred |
| Example 2 | 50% | 80% | 55100 |
| Comparative example 1 | 50% | 50% | 45000 |
| Comparative example 2 | 50% | 30% | 15000 |

As can be seen from Table 2, it was found that occurrence of banding can be suppressed by the configuration of Example 2 as compared with Comparative Examples 1 and 2.

As described above, in the present example, the contact area ratio of the end of the brush member 11 in the longitudinal direction X is set to be higher than the contact area ratio in the image area. With this configuration, toner leakage from the brush member 11 can be reduced. In addition, it is possible to reduce the possibility of occurrence of inconveniences such as scattering of toner dirt and image defects (banding) caused by the toner leakage from the brush member 11.

Example 3

As Example 3, an example of a configuration in which the thickness of the hair at the end of the brush member 11 is increased will be described. The brush member 11 according to the present example can be used, instead of the brush member 11 according to Example 1, in the image forming apparatus 100 described in Example 1. Hereinafter, unless otherwise specified, elements denoted by the same reference signs as those in Example 1 have substantially the same configurations and functions as those described in Example 1, and differences from Example 1 will be mainly described.

Configuration of Brush Member

Figure 17A:
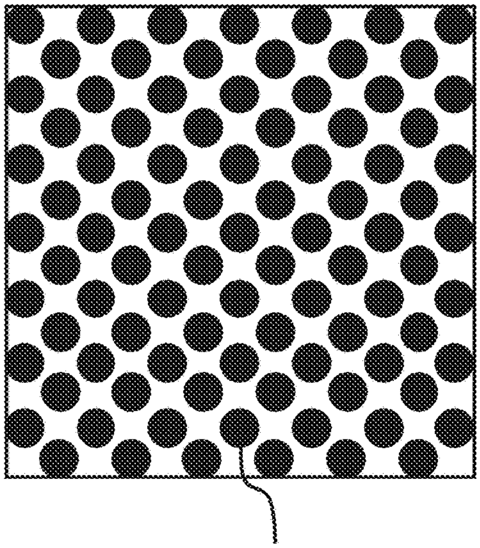
FIG. 17A is a view for explaining a brush member according to Example 3.
Figure 17B:
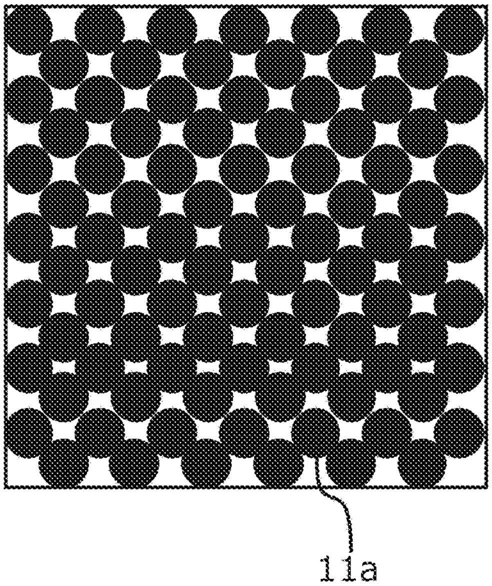
FIG. 17B is a view for explaining the brush member according to Example 3.

FIGS. 17A and 17B are views each schematically illustrating a state in which the brush member 11 is observed from the distal end side of the conductive threads 11*a* as hair in Example 3. FIG. 17A shows a portion of the brush member 11 in the image area, and FIG. 17B shows a portion of the brush member 11 in an end area 11E outside the image area in the longitudinal direction X. Black circles in FIGS. 17A and 17B represent the conductive threads 11*a*.

As illustrated in FIGS. 17A and 17B, in the present example, the thickness of the conductive threads 11*a* in the end area 11E outside the image area is larger than the thickness of the conductive threads 11*a* in the image area. In the present example, the thickness of the conductive threads 11*a* in the end area 11E is 6 denier, and the thickness of the conductive threads 11*a* in the image area is 2 denier. The density of the conductive threads 11*a* is 240 kF/inch^2 in common in the image area and the end area 11E.

Figure 17C:
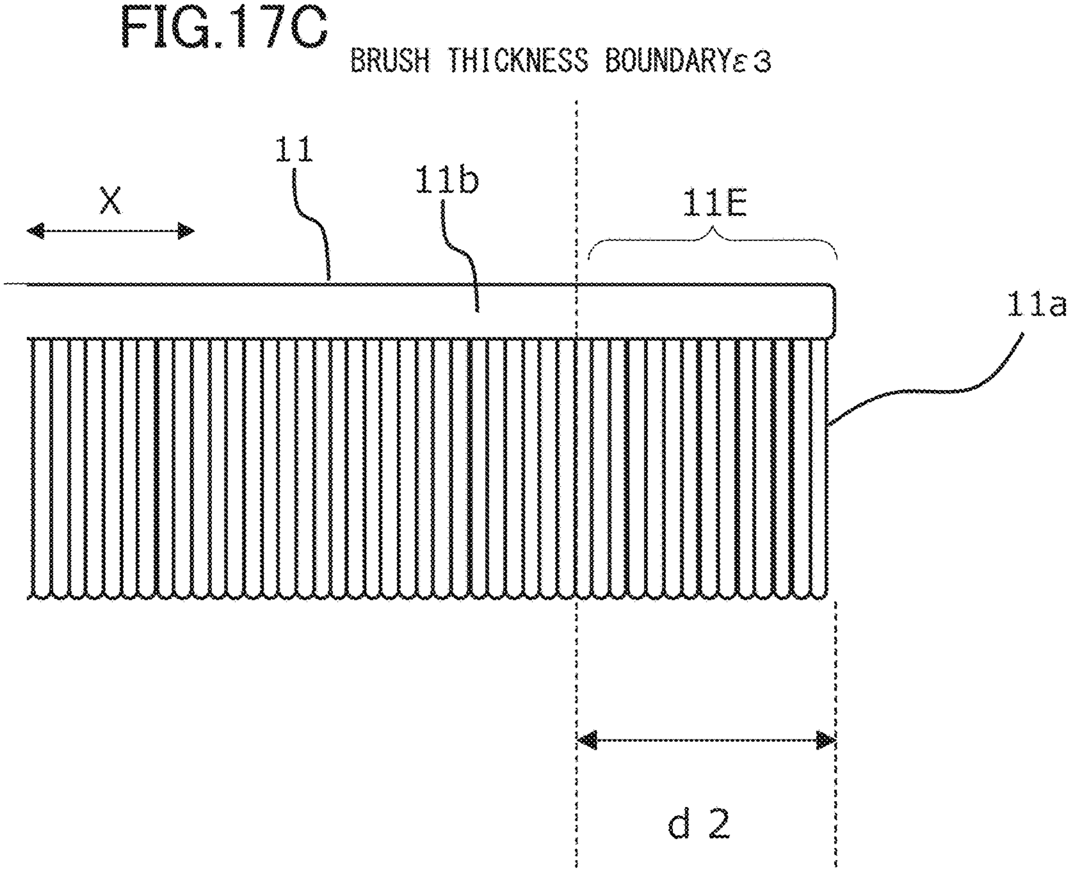
FIG. 17C is a view for explaining the brush member according to Example 3.

As illustrated in FIG. 17C, an inner end of the end area 11E in the longitudinal direction X (a position where the density of the conductive threads 11*a* is changed) is defined as a brush thickness boundary ε3. In the present example, a length of the brush member 11 in the longitudinal direction X is 236 mm, and a distance d2 in the longitudinal direction X from the outer end of the brush member 11 in the longitudinal direction X to the brush thickness boundary ε3 is 3 mm. That is, the width of the end area 11E in the longitudinal direction X is 3 mm.

In the present example, the contact area ratio of the brush member 11 was 50% in the image area and 80% in the end area 11E. As described above, by providing an area (an end area 11E) having a high contact area ratio outside the image area in the longitudinal direction X, toner leakage from the brush member 11 can be reduced.

Note that the Clark Evans Index w of the brush member 11 is preferably w≥1 as in Example 1. In addition, the inroad amount of the brush member 11 against the photosensitive drum 10, the inclination angle β of the brush member 11 with respect to the photosensitive drum 10, and the like can be set to the same values as those exemplified in Example 1.

Position of Brush Thickness Boundary in Longitudinal Direction

A preferable position of the brush thickness boundary ε3 will be described. The brush thickness boundary ε3 according to the present example is an example of an inner end of the portion where the contact area ratio is high of the brush member in the rotation axis direction of the image bearing member.

As described in Example 1, when more transfer residual toner than usual is generated, it may be difficult to avoid toner leakage from the brush member 11. Even in such a case, it is preferable to set the position of the brush thickness boundary ε3 such that at least an occurrence of an image defect can be suppressed.

The brush thickness boundary ε3 is preferably located outside an outer end X1 of the end seal 30 in the longitudinal direction X. Further, the brush thickness boundary ε3 is preferably located inside an inner end of the contact member 31 in the longitudinal direction X. In addition, the brush thickness boundary ε3 is preferably located inside an outer end X2 of the outer circumferential surface of the developing roller 25 in the longitudinal direction X.

By setting the position of the brush thickness boundary ε3 as described above, the possibility of occurrence of inconvenience such as an image defect can be reduced as much as possible even when more transfer residual toner than usual is generated.

Note that, although the entire area from the brush thickness boundary ε3 to the outer end of the brush member 11 in the longitudinal direction X is set as the end area 11E, which is an area where the contact area ratio is high (an area where the thickness of the conductive threads 11*a* is large) in the present example, the brush member 11 is not limited thereto. The brush member 11 may have a portion having a higher contact area ratio (a portion where the thickness of the conductive threads 11*a* is larger) than the image area in at least a portion of the area outside the image area in the longitudinal direction X.

Experiments for Verification

Experiments were conducted to verify whether the configuration according to the present example is capable of reducing toner leakage from the brush member 11. In a comparative example, the contact area ratio at the end of the brush member 11 was equal to or smaller than the contact area ratio in the image area. The specific Comparative Examples 1 and 2 and the specific method of experimental verification are the same as those described in Example 1. The experimental results are shown in Table 3.

TABLE 3

| | Contact area ratio at leading edge portion | | Number of sheets where bending |
|---|---|---|---|
| | Central portion | End portion | occurred |
| Example 3 | 50% | 80% | 54800 |
| Comparative example 1 | 50% | 50% | 45000 |
| Comparative example 2 | 50% | 30% | 15000 |

As can be seen from Table 3, it was found that occurrence of banding can be suppressed by the configuration of Example 3 as compared with Comparative Examples 1 and 2.

As described above, in the present example, the contact area ratio of the end of the brush member 11 in the longitudinal direction X is set to be higher than the contact area ratio in the image area. With this configuration, toner leakage from the brush member 11 can be reduced. In addition, it is possible to reduce the possibility of occurrence of inconveniences such as scattering of toner dirt and image defects (banding) caused by the toner leakage from the brush member 11.

Example 4

As Example 4, an example of a configuration in which the inroad amount at the end of the brush member 11 is increased will be described. The brush member 11 according to the present example can be used, instead of the brush member 11 according to Example 1, in the image forming apparatus 100 described in Example 1. Hereinafter, unless otherwise specified, elements denoted by the same reference signs as those in Example 1 have substantially the same configurations and functions as those described in Example 1, and differences from Example 1 will be mainly described.

Configuration of Brush Member

Figure 18:
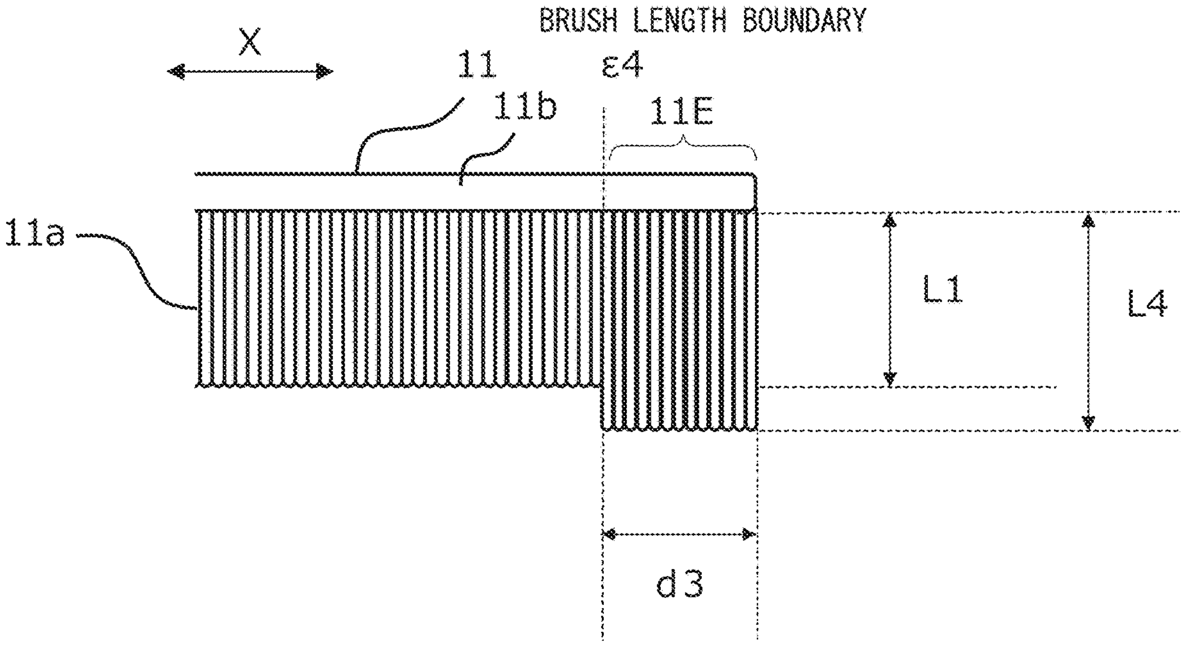
FIG. 18 is a view for explaining a brush member according to Example 4.

FIG. 18 is a view of the brush member 11 according to Example 4 as viewed in the transverse direction Y In the present example, a length L4 of the conductive threads 11*a* in the end area 11E outside the image area is larger than a length L1 of the conductive threads 11*a* in the image area. Here, each of the lengths L1 and L4 of the conductive threads 11*a* refers to a mean distance (fabric length) from the base cloth 11*b* to the distal ends of the conductive threads 11*a* in a direction perpendicular to the base cloth 11*b*, which is a sheet-shaped base, in a state where the brush member 11 is not in contact with the photosensitive drum 10. In the present example, the length L1 of the conductive threads 11*a* in the image area is 5.75 mm, and the length L4 of the conductive threads 11*a* in the end area 11E is 6.75 mm. The thickness and density of the conductive threads 11*a* are 2 denier and 240 kF/inch^2 in common in the image area and the end area 11E, respectively.

As described above, since the length of the conductive threads 11*a* in the end area 11E is larger than that in the image area, the inroad amount of the brush member 11 against the photosensitive drum 10 in the end area 11E is larger than that in the image area.

As illustrated in FIG. 18, an inner end of the end area 11E in the longitudinal direction X (a position where the length of the conductive threads 11*a* is changed) is defined as a brush length boundary ε4. In the present example, a length of the brush member 11 in the longitudinal direction X is 236 mm, and a distance d3 in the longitudinal direction X from the outer end of the brush member 11 in the longitudinal direction X to the brush length boundary ε4 is 3 mm. That is, the width of the end area 11E in the longitudinal direction X is 3 mm.

In the present example, the contact area ratio of the brush member 11 was 50% in the image area and 80% in the end area 11E. As described above, by providing an area (an end area 11E) having a high contact area ratio outside the image area in the longitudinal direction X, toner leakage from the brush member 11 can be reduced.

Note that the Clark Evans Index w of the brush member 11 is preferably w≥1 as in Example 1. In addition, the inroad amount of the brush member 11 against the photosensitive drum 10, the inclination angle β of the brush member 11 with respect to the photosensitive drum 10, and the like can be set to the same values as those exemplified in Example 1.

Position of Brush Length Boundary in Longitudinal Direction

A preferable position of the brush length boundary ε4 will be described. The brush length boundary ε4 according to the present example is an example of an inner end of the portion where the contact area ratio is high of the brush member in the rotation axis direction of the image bearing member.

As described in Example 1, when more transfer residual toner than usual is generated, it may be difficult to avoid toner leakage from the brush member 11. Even in such a case, it is preferable to set the position of the brush length boundary ε4 such that at least an occurrence of an image defect can be suppressed.

The brush length boundary ε4 is preferably located outside an outer end X1 of the end seal 30 in the longitudinal direction X. The brush length boundary ε4 is preferably located inside an inner end of the contact member 31 in the longitudinal direction X. In addition, the brush length boundary ε4 is preferably located inside an outer end X2 of the outer circumferential surface of the developing roller 25 in the longitudinal direction X.

By setting the position of the brush length boundary ε4 as described above, the possibility of occurrence of inconvenience such as an image defect can be reduced as much as possible even when more transfer residual toner than usual is generated.

Note that, although the entire area from the brush length boundary ε4 to the outer end of the brush member 11 in the longitudinal direction X is set as the end area 11E, which is an area where the contact area ratio is high (an area where the length of the conductive threads 11*a* is large) in the present example, the brush member 11 is not limited thereto. The brush member 11 may have a portion having a higher contact area ratio (a portion where the length of the conductive threads 11*a* is larger) than the image area in at least a portion of the area outside the image area in the longitudinal direction X.

Experiments for Verification

Experiments were conducted to verify whether the configuration according to the present example is capable of reducing toner leakage from the brush member 11. In a comparative example, the contact area ratio at the end of the brush member 11 was equal to or smaller than the contact area ratio in the image area. The specific Comparative Examples 1 and 2 and the specific method of experimental verification are the same as those described in Example 1. The experimental results are shown in Table 4.

TABLE 4

| | Contact area ratio at leading edge portion | | Number of sheets where bending |
|---|---|---|---|
| | Central portion | End portion | occurred |
| Example 4 | 50% | 80% | 54900 |
| Comparative example 1 | 50% | 50% | 45000 |
| Comparative example 2 | 50% | 30% | 15000 |

As can be seen from Table 4, it was found that occurrence of banding can be suppressed by the configuration of Example 4 as compared with Comparative Examples 1 and 2.

As described above, in the present example, the contact area ratio of the end of the brush member 11 in the longitudinal direction X is set to be higher than the contact area ratio in the image area. With this configuration, toner leakage from the brush member 11 can be reduced. In addition, it is possible to reduce the possibility of occurrence of inconveniences such as scattering of toner dirt and image defects (banding) caused by the toner leakage from the brush member 11.

Modification

Although it is exemplified in Example 4 that the conductive threads 11*a* have different lengths in the end area 11E and in the image area, but the method is not limited thereto. For example, by providing an inclined surface or a step at an end of the support member that supports the brush member 11, the inroad amount of the brush member 11 at an end thereof against the photosensitive drum 10 may be larger than that in the image area to increase the contact area ratio.

Other Examples

The configurations of the brush members 11 described in the above-described examples, respectively, may be applied to one brush member 11 in any combination. For example, while the thickness of the conductive threads 11*a* at the end of the brush member 11 in the longitudinal direction X is larger than that in the image area, and the density of the conductive threads 11*a* at the end of the brush member 11 may be higher than that in the image area.

In addition, in each of the above-described examples, the configuration for the direct transfer scheme in which a toner image is directly transferred from the photosensitive drum 10 (the image bearing member) to a sheet (a recording material) as a transfer object has been described. However, the present technology may be applied to an image forming apparatus in an intermediate transfer scheme. In the intermediate transfer scheme, the transfer unit refers to, for example, a primary transfer roller that primarily transfers a toner image from the photosensitive drum 10 as an image bearing member to an intermediate transfer member as a transfer object. As the intermediate transfer member, an endless belt member stretched around a plurality of rollers can be used. The toner image primarily transferred to the intermediate transfer member is secondarily transferred from the intermediate transfer member to a sheet (a recording material) by a secondary transfer unit such as a secondary transfer roller that forms a secondary transfer nip portion with the intermediate transfer member. Even in such a configuration in the intermediate transfer scheme, it is possible to obtain advantages similar to those of the above-described embodiment by replacing the transfer roller in the above-described embodiment with the primary transfer roller.

As described above, according to the present disclosure, it is possible to provide an image forming apparatus capable of reducing toner leakage from a brush member.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-037890, filed on Mar. 10, 2023, which is hereby incorporated by reference herein in its entirety.

What is claimed is:

1. An image forming apparatus comprising:

a photosensitive drum configured to rotate;

a developing roller configured to develop an electrostatic latent image formed on a surface of the photosensitive drum using toner in a developing portion, the developing portion being a region where the surface of the photosensitive drum faces the developing roller;

a transfer roller configured to transfer a toner image developed by the developing roller from the surface of the photosensitive drum to a recording material in a transfer portion, the transfer portion being a region where the surface of the photosensitive drum faces the transfer roller such that a transfer nip is formed between the photosensitive drum and the transfer roller; and a brush member including (1) a base extending in a rotation axis direction of the photosensitive drum and (2) bristles supported by the base, the brush member being configured to come into contact with the surface of the photosensitive drum in a contact portion, the contact portion being a region at which the photosensitive drum contacts the bristles and which is located downstream of the transfer portion and upstream of the developing portion in a rotation direction of the photosensitive drum, wherein the image forming apparatus is configured such that toner that has not been transferred to the recording material in the transfer portion is collected by the developing roller, wherein the brush member is a non-rotatable brush member fixed to a frame of the image forming apparatus, wherein in a case where a range in a rotation axis direction of the photosensitive drum in which the developing roller is configured to supply toner to the developing portion is defined as an image area: (1) the brush member includes an end portion located outside the image area with respect to the rotation axis direction, and (2) the bristles in the end portion are inclined, with respect to a direction perpendicular to the base, toward a center of the brush member in the rotation axis direction such that an inroad amount of the bristles in the end portion with respect to the surface of the photosensitive drum is smaller than inroad amount of the bristles in the image area with respect to the surface of the photosensitive drum.

2. The image forming apparatus according to claim 1, wherein within the end portion, an inclination angle of each bristle with respect to the direction perpendicular to the base is larger at a position closer to an edge of the base in the rotation axis direction, such that an inroad amount of each bristle is smaller at a position closer to the edge of the base in the rotation axis direction.

3. The image forming apparatus according to claim 1, wherein a density of the bristles in the end portion is higher than a density of the bristles in the image area.

4. The image forming apparatus according to claim 1, wherein a thickness of the bristles in the end portion is larger than a thickness of the bristles in the image area.

5. The image forming apparatus according to claim 1, wherein a length of the bristles with respect to the base in the end portion is larger than a length of the bristles with respect to the base in the image area.

6. The image forming apparatus according to claim 1, further comprising:

a developing container configured to store toner; and an end seal configured to seal an end of the image area in the rotation axis direction to keep the toner stored in the developing container from leaking out of the developing container, wherein an inner end of the end portion of the brush member in the rotation axis direction is located outside an outer end of the end seal in the rotation axis direction.

7. The image forming apparatus according to claim 6, further comprising:

a spacer provided at an end of the developing roller in the rotation axis direction and configured to contact a portion of the photosensitive drum to regulate a position of the developing roller with respect to the photosensitive drum, wherein the inner end of the end portion of the brush member in the rotation axis direction is located inside an inner end of the spacer in the rotation axis direction.

8. The image forming apparatus according to claim 1, further comprising:

a spacer provided at an end of the developing roller in the rotation axis direction and configured to contact a portion of the photosensitive drum to regulate a position of the developing roller with respect to the photosensitive drum, wherein an inner end of the end portion of the brush member in the rotation axis direction is located inside an inner end of the spacer in the rotation axis direction.

9. The image forming apparatus according to claim 1, wherein the developing roller has an outer circumferential surface configured to be in contact with the photosensitive drum, and wherein an inner end of the end portion of the brush member in the rotation axis direction is located inside an outer end of the outer circumferential surface in the rotation axis direction.

10. The image forming apparatus according to claim 1, wherein the end portion of the brush member includes an outer end of the brush member in the rotation axis direction.

11. The image forming apparatus according to claim 1, further comprising:

a charging member configured to charge the surface of the photosensitive drum in a charging portion, wherein the brush member is disposed downstream of the transfer portion and upstream of the charging portion in the rotation direction of the photosensitive drum.

12. The image forming apparatus according to claim 1, wherein, in a case where a ratio of an area in which the bristles are in contact with the photosensitive drum per unit area in the contact portion is defined as a contact area ratio, a contact area ratio in the end portion is higher than the contact area ratio in the image area.

13. The image forming apparatus according to claim 12, wherein the contact area ratio in the image area is 18% or more and 74% or less, wherein the brush member has a Clark-Evans Index of 1 or more in the image area, and wherein the contact area ratio in the end portion is 65% or more.

* * * * *